(12) United States Patent
Marr

(10) Patent No.: US 8,092,850 B2
(45) Date of Patent: Jan. 10, 2012

(54) MEAT TREATMENT APPARATUS AND METHOD

(76) Inventor: Russell A. Marr, Lincoln, NE (US)

( * ) Notice: Subject to any disclaimer, the term of this patent is extended or adjusted under 35 U.S.C. 154(b) by 379 days.

(21) Appl. No.: 12/497,142

(22) Filed: Jul. 2, 2009

(65) Prior Publication Data

US 2010/0009053 A1    Jan. 14, 2010

Related U.S. Application Data

(60) Provisional application No. 61/134,311, filed on Jul. 9, 2008.

(51) Int. Cl.
*A23B 4/044* (2006.01)

(52) U.S. Cl. .......... 426/315; 426/466; 426/523; 99/340; 99/447; 99/450; 99/475; 99/480; 99/481; 99/482; 99/483; D7/334

(58) Field of Classification Search .......... 426/314–315, 426/466, 523; 99/340, 357, 447, 450, 473–476, 99/480–483; D7/323, 334, 353, 332; 126/15 A, 126/21 A See application file for complete search history.

(56) References Cited

U.S. PATENT DOCUMENTS

| | | | | |
|---|---|---|---|---|
| 3,087,414 A * | 4/1963 | Gannon | | 99/393 |
| 3,266,409 A * | 8/1966 | Oyler | | 99/331 |
| 3,789,824 A * | 2/1974 | Mason | | 126/59.5 |
| 4,076,008 A * | 2/1978 | Deaton | | 126/25 R |
| D263,440 S * | 3/1982 | Feild | | D7/332 |
| 4,510,854 A * | 4/1985 | Robertson | | 99/337 |
| 4,664,026 A * | 5/1987 | Milloy | | 99/352 |
| 4,700,618 A * | 10/1987 | Cox, Jr. | | 99/339 |
| D295,136 S * | 4/1988 | Cox, Jr. | | D7/334 |
| 4,934,260 A * | 6/1990 | Blevins | | 99/482 |
| 5,000,085 A * | 3/1991 | Archer | | 99/445 |
| D370,823 S * | 6/1996 | Traeger et al. | | D7/332 |
| 5,713,267 A * | 2/1998 | Wilson | | 99/482 |
| D427,484 S * | 7/2000 | Ethridge | | D7/402 |
| 6,209,533 B1 * | 4/2001 | Ganard | | 126/25 R |
| 6,298,774 B1 * | 10/2001 | Latham et al. | | 99/340 |
| 6,705,213 B1 * | 3/2004 | Thomas | | 99/482 |
| D491,410 S * | 6/2004 | Saunders | | D7/334 |
| D563,151 S * | 3/2008 | Henry | | D7/334 |
| 2006/0254433 A1* | 11/2006 | Oberlander et al. | | 99/448 |
| 2007/0028914 A1* | 2/2007 | Galdamez | | 126/29 |

OTHER PUBLICATIONS

Web page for Brinkmann SmokeN Pit Professional, Jan. 17, 2008.
Web page "Choosing The Best Barbecue Smoker Is Personal", Jan. 17, 2008.
Web page BLUEGATCO Barbeque Smoker Tips, Jan. 17, 2008.
Web page Char-Griller Smokin' Pro, Jan. 17, 2008.
Web page "Competition BBQ Secrets" for a Lang Smoker, Jan. 20, 2008.

(Continued)

*Primary Examiner* — Drew E Becker
(74) *Attorney, Agent, or Firm* — Vincent L. Carney

(57) ABSTRACT

An offset barbeque smoker grille has an openable cover shaped as the elongated back portion of a quadruped and the products of combustion are applied to meat on said grille with the cover closed and at least one restrictor is included in said fourth flow path to hold smoke in contact with said meat wherein a meat treatment apparatus is used as a smoker. The cooking and smoking uses counter flow from the firebox near the head of the quadruped under the cooking and smoking chambers toward the rump of the quadruped and back over the top of the cooking chambers to provide even cooking.

11 Claims, 21 Drawing Sheets

OTHER PUBLICATIONS

Web page for Brinkmann 805-2101-S Pitmaster Deluxe Smoke 'N Pit, customer review Jun. 23, 2006; Jan. 19, 2008.
Web page BBQ FAX Section 5.1; Jan. 19, 2008.
Web page: About.com: Barbecues & Grilling, Top 10 Smokers over $400 for 2007; Jan. 19, 2008.
Web page: Horizon Smokers; Jan. 17, 2008.

* cited by examiner

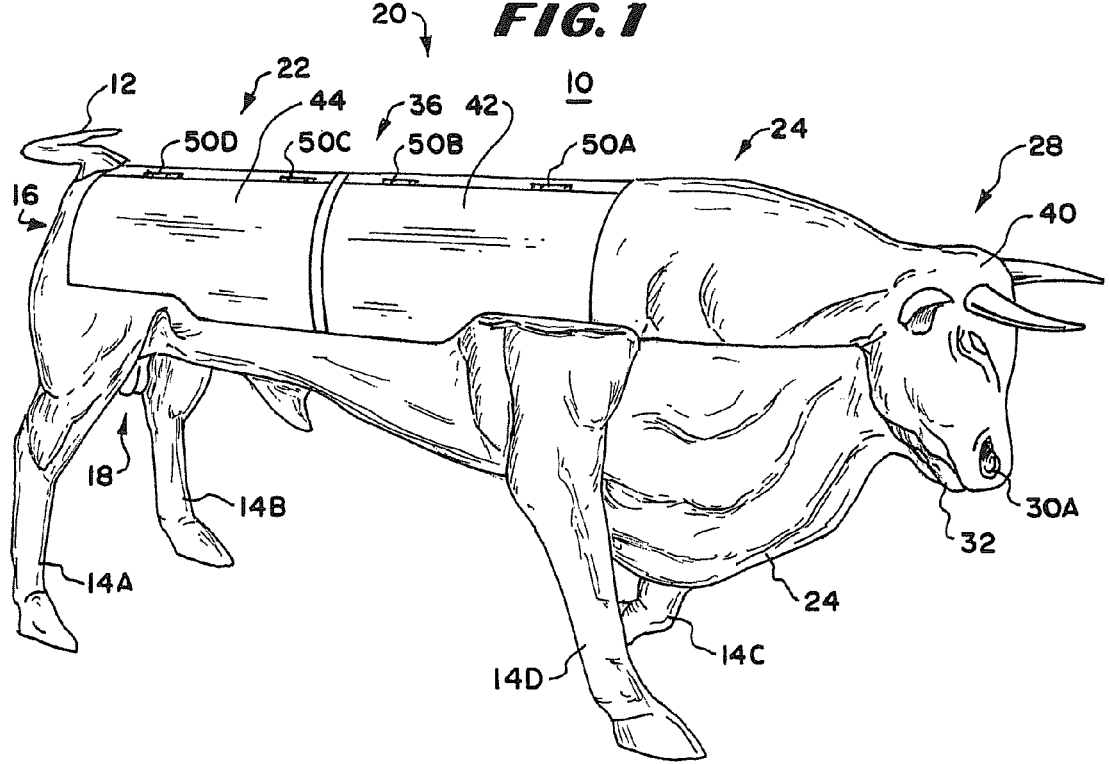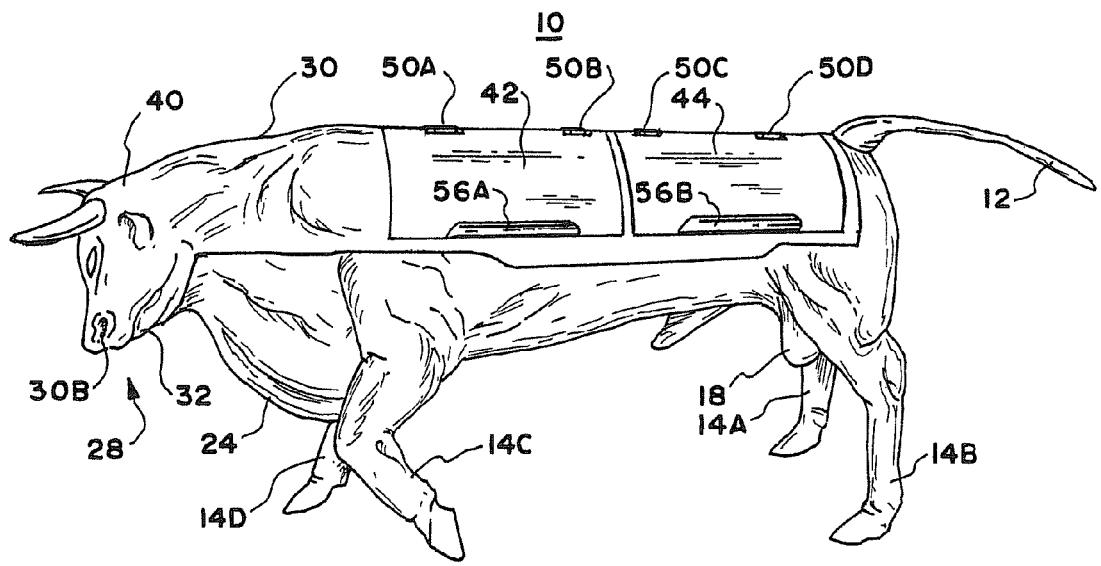

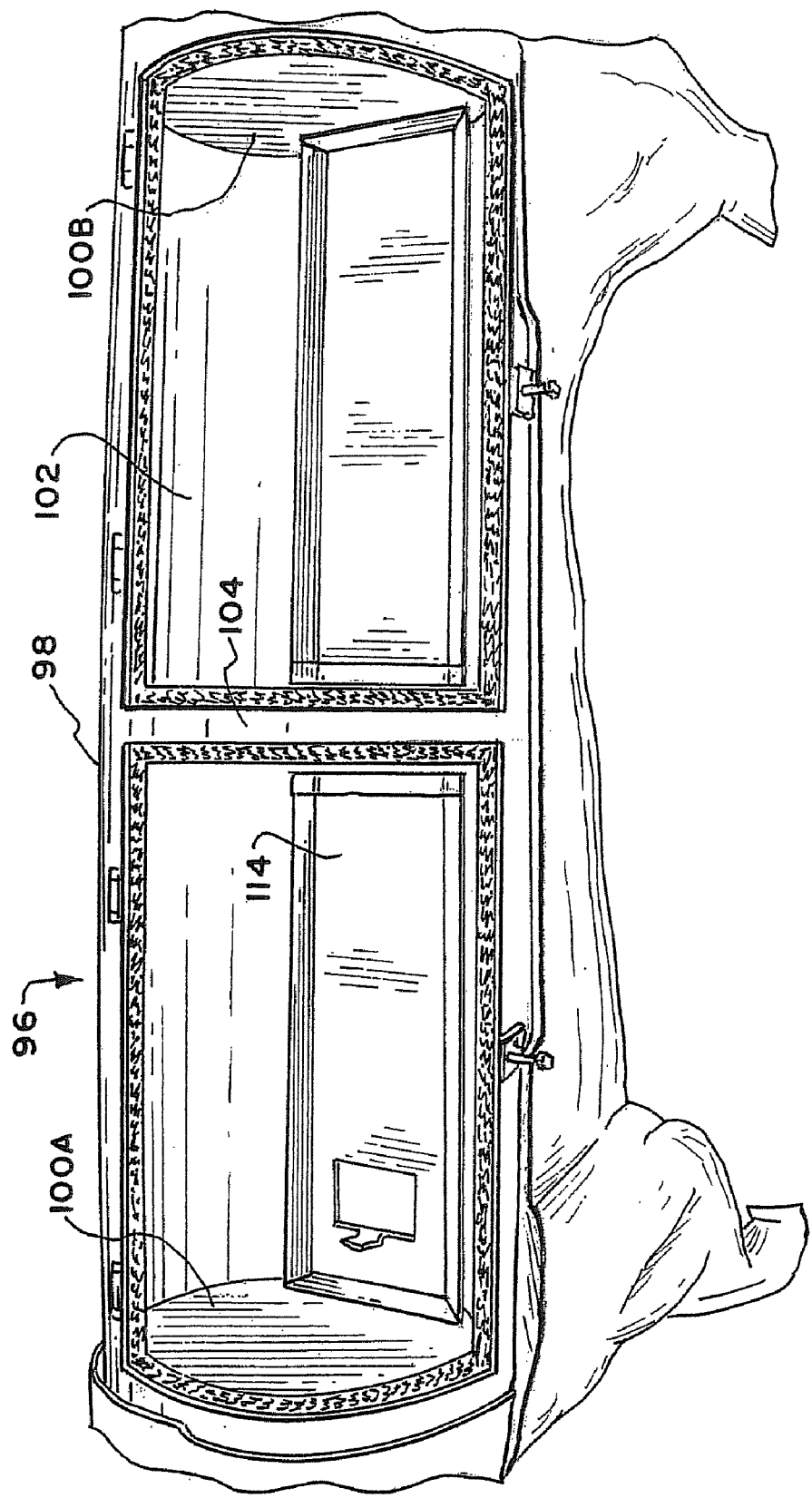

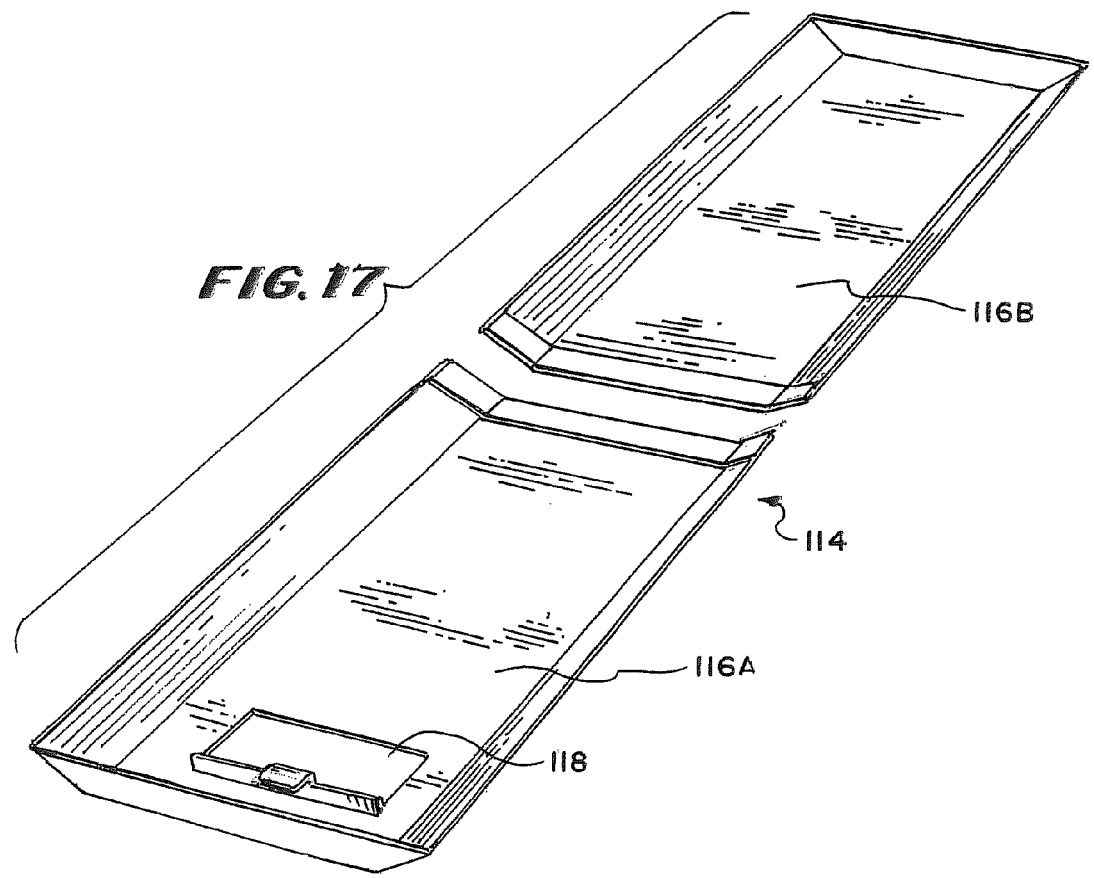
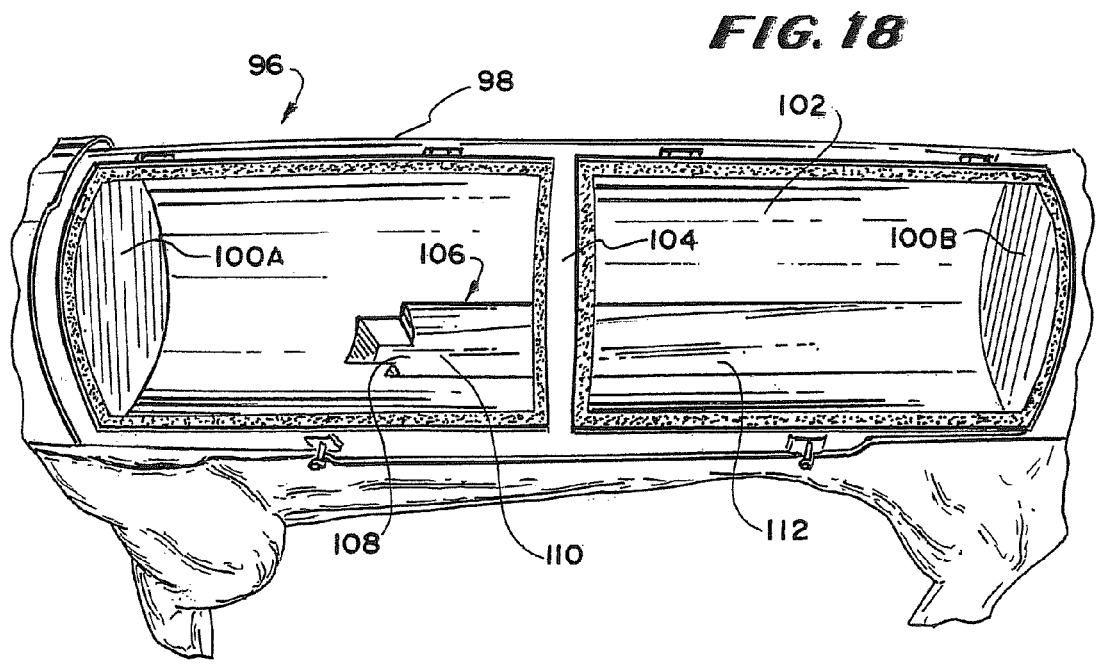

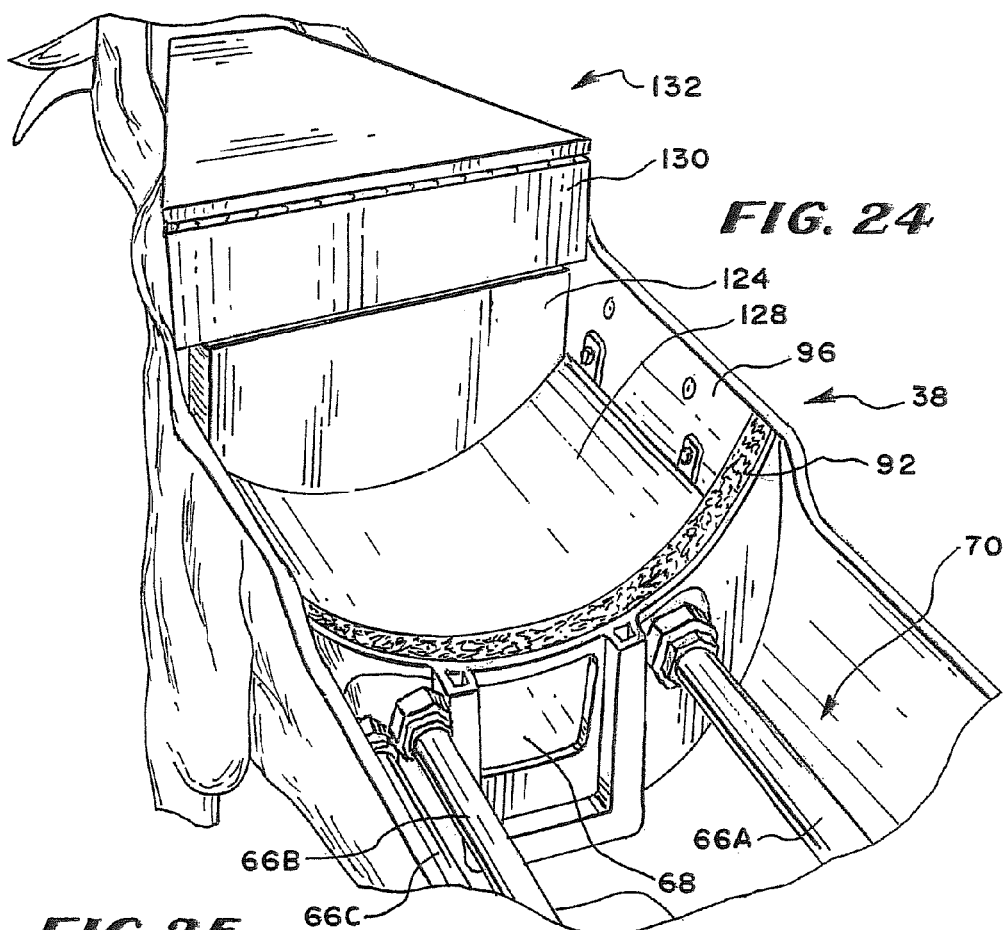
FIG. 24
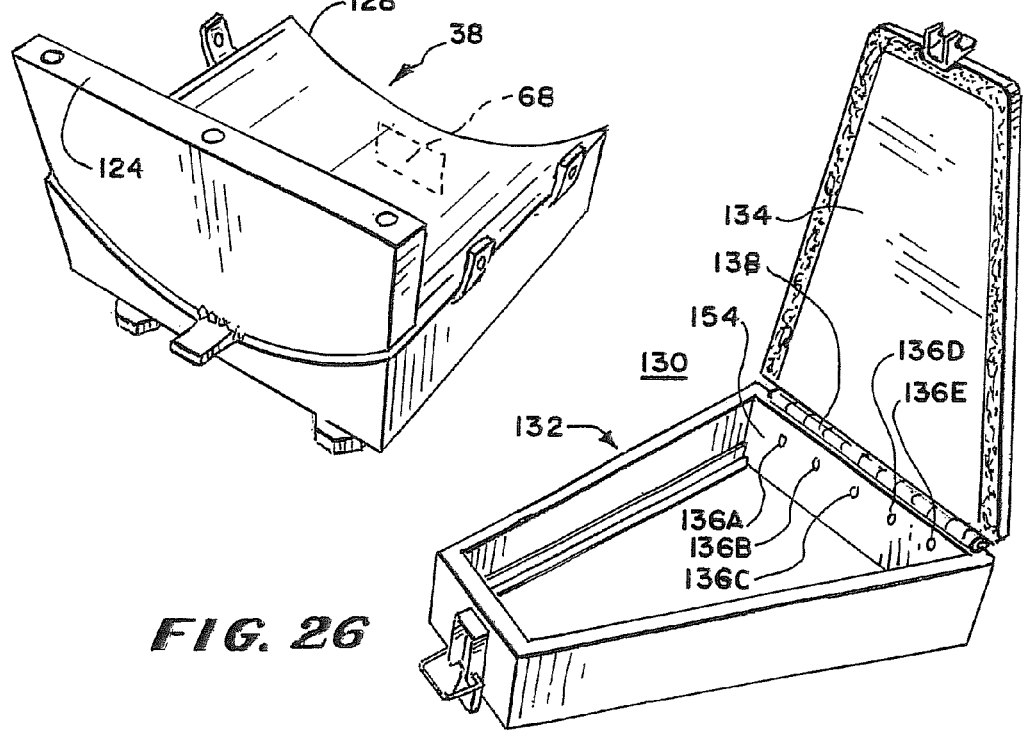
FIG. 25
FIG. 26

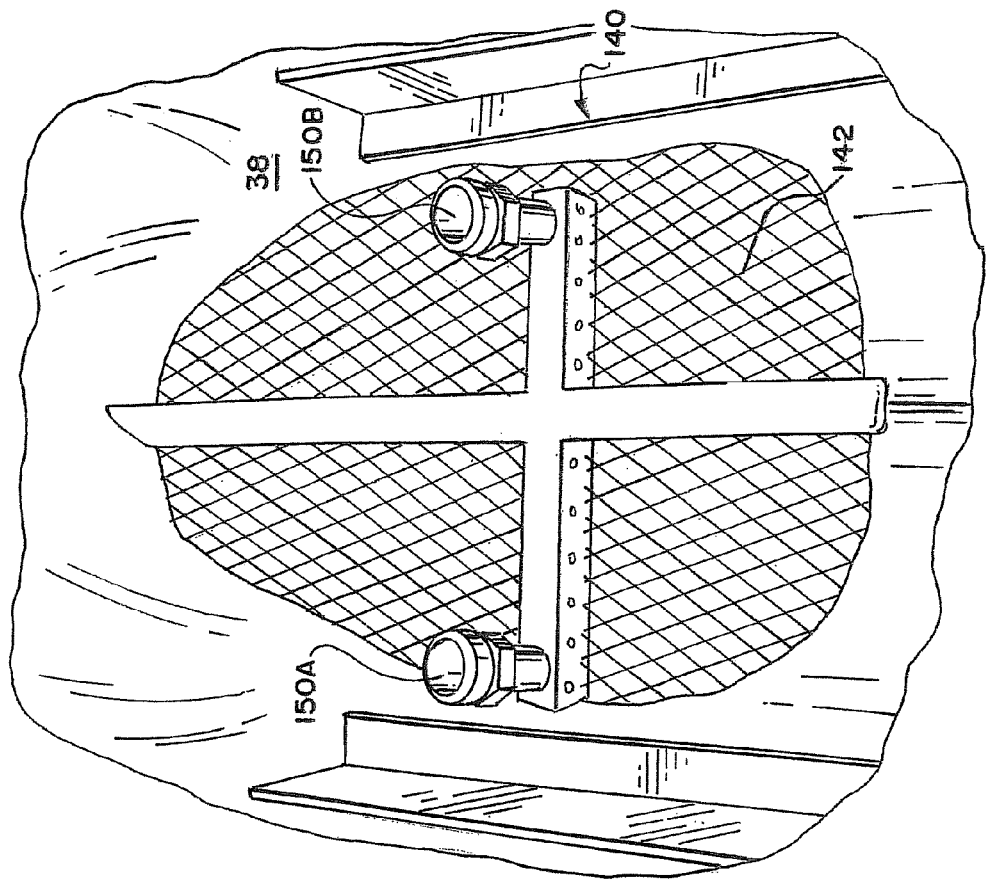
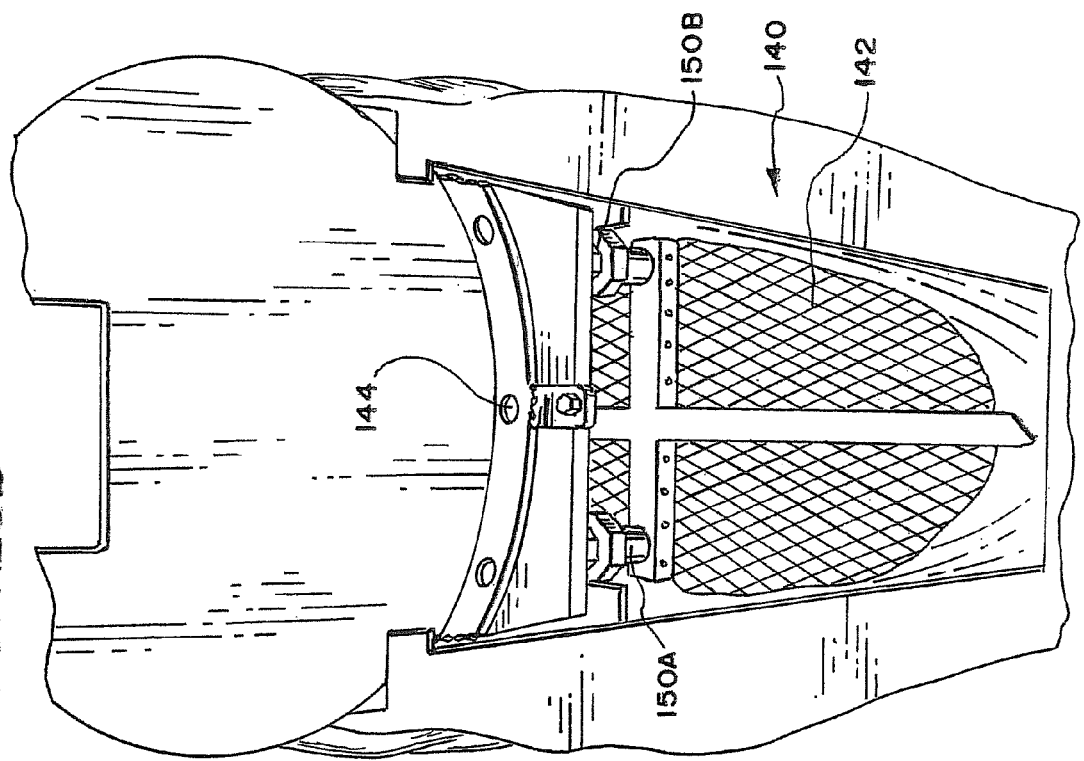

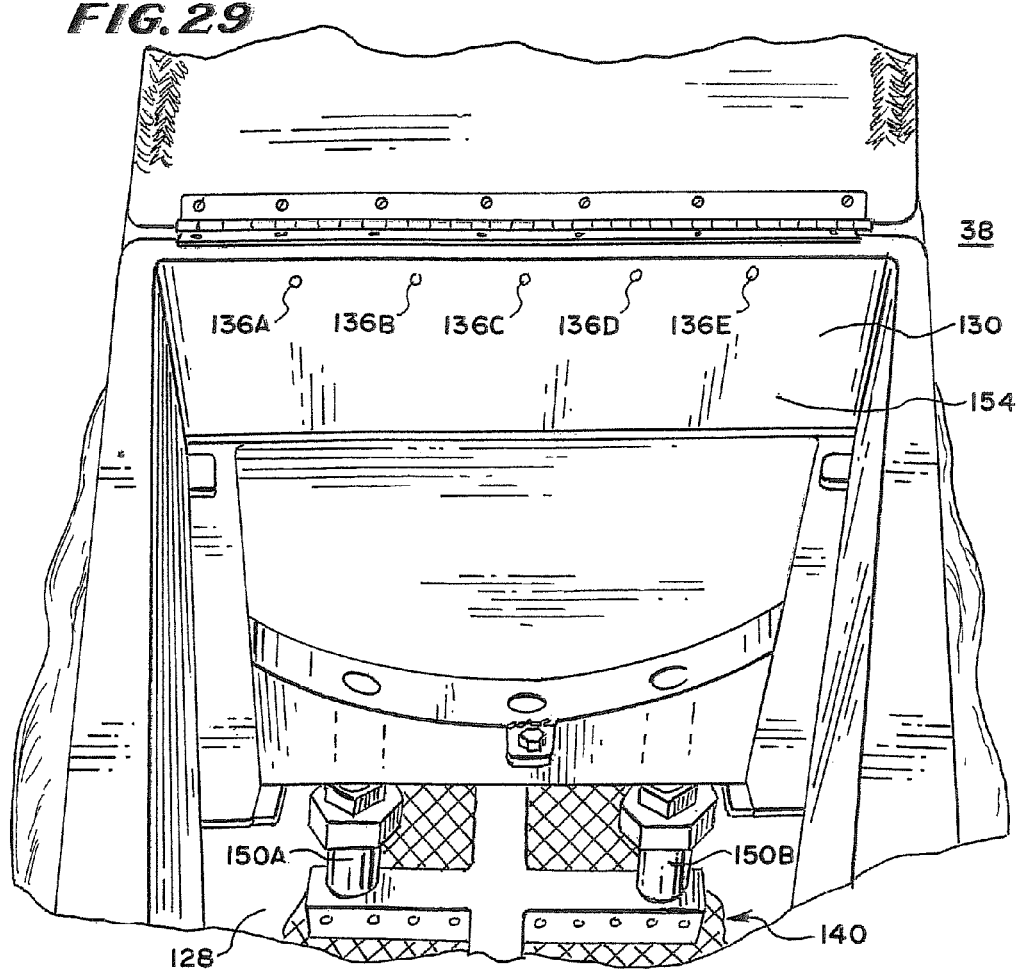
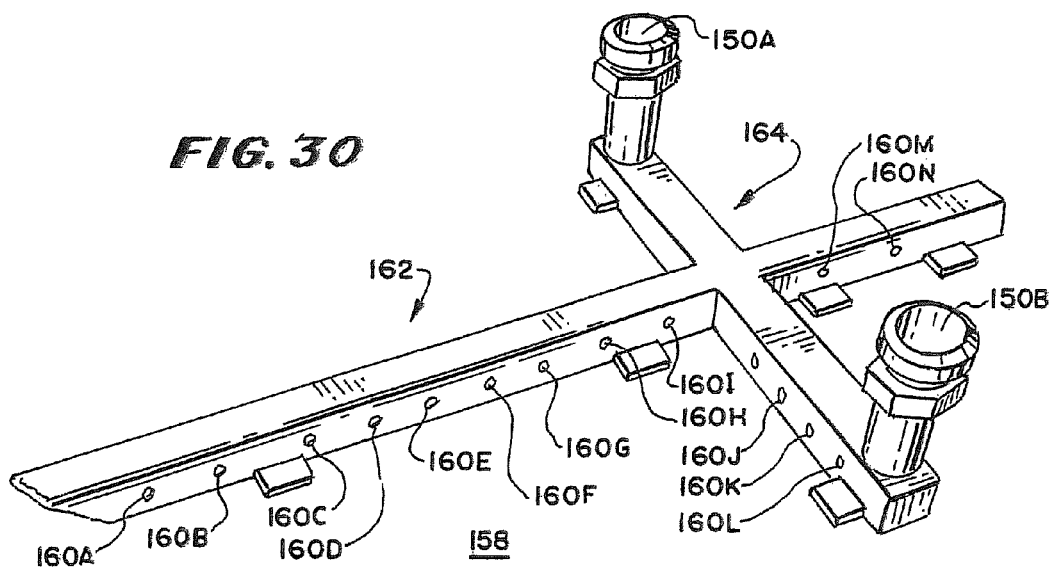

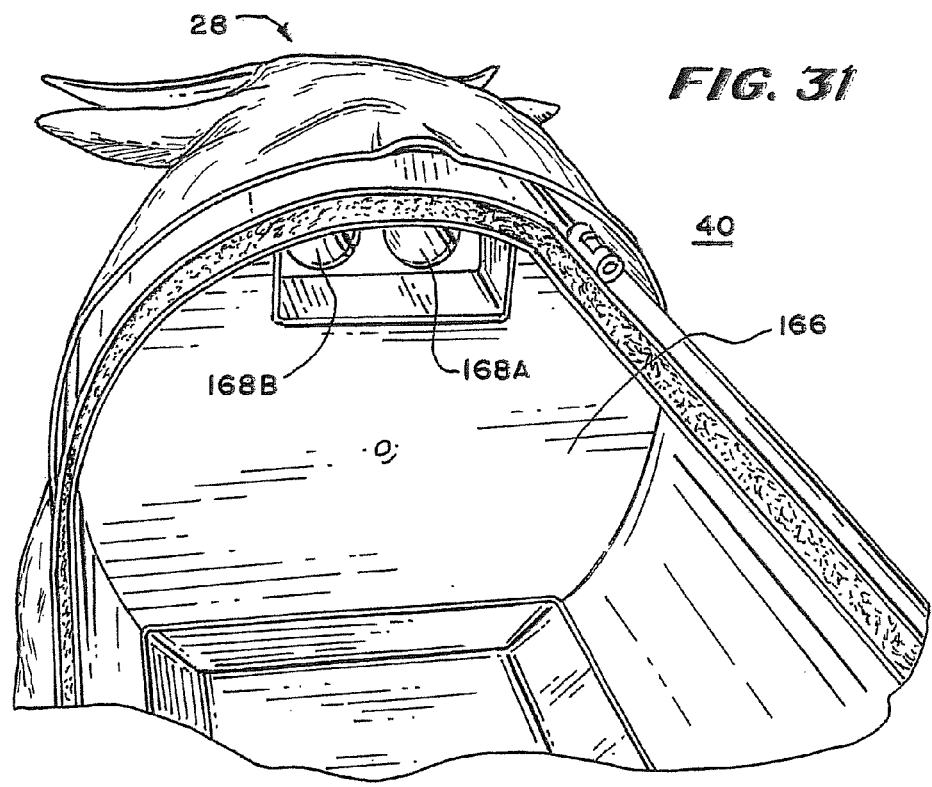
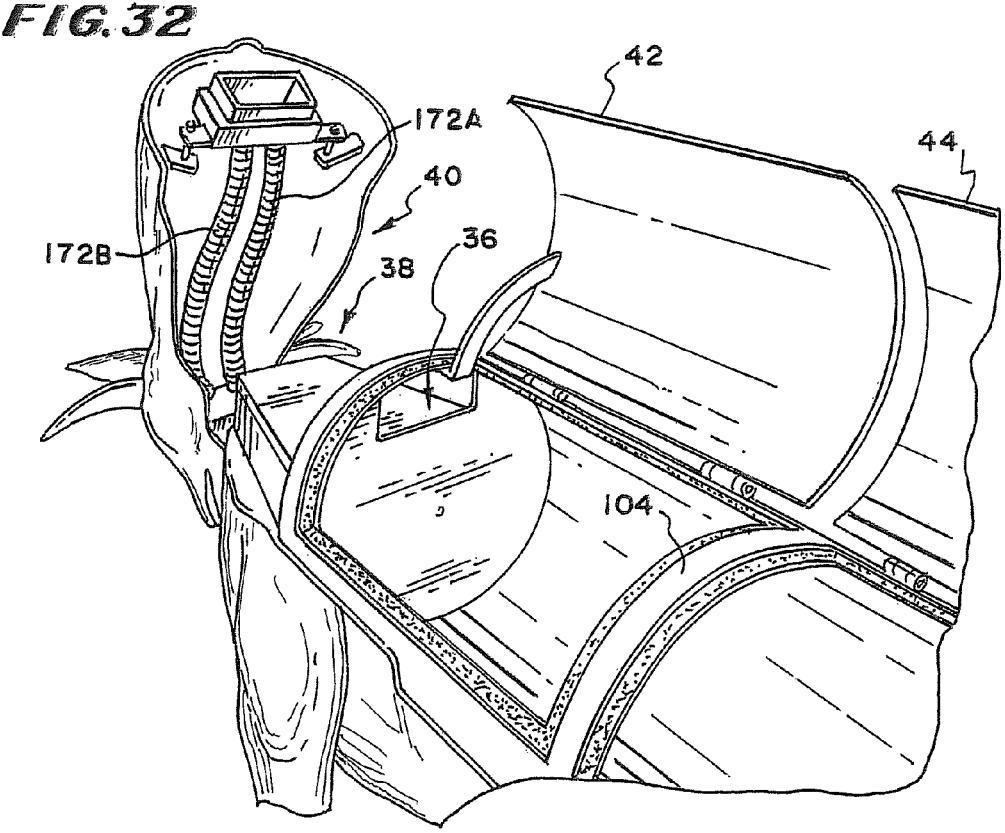

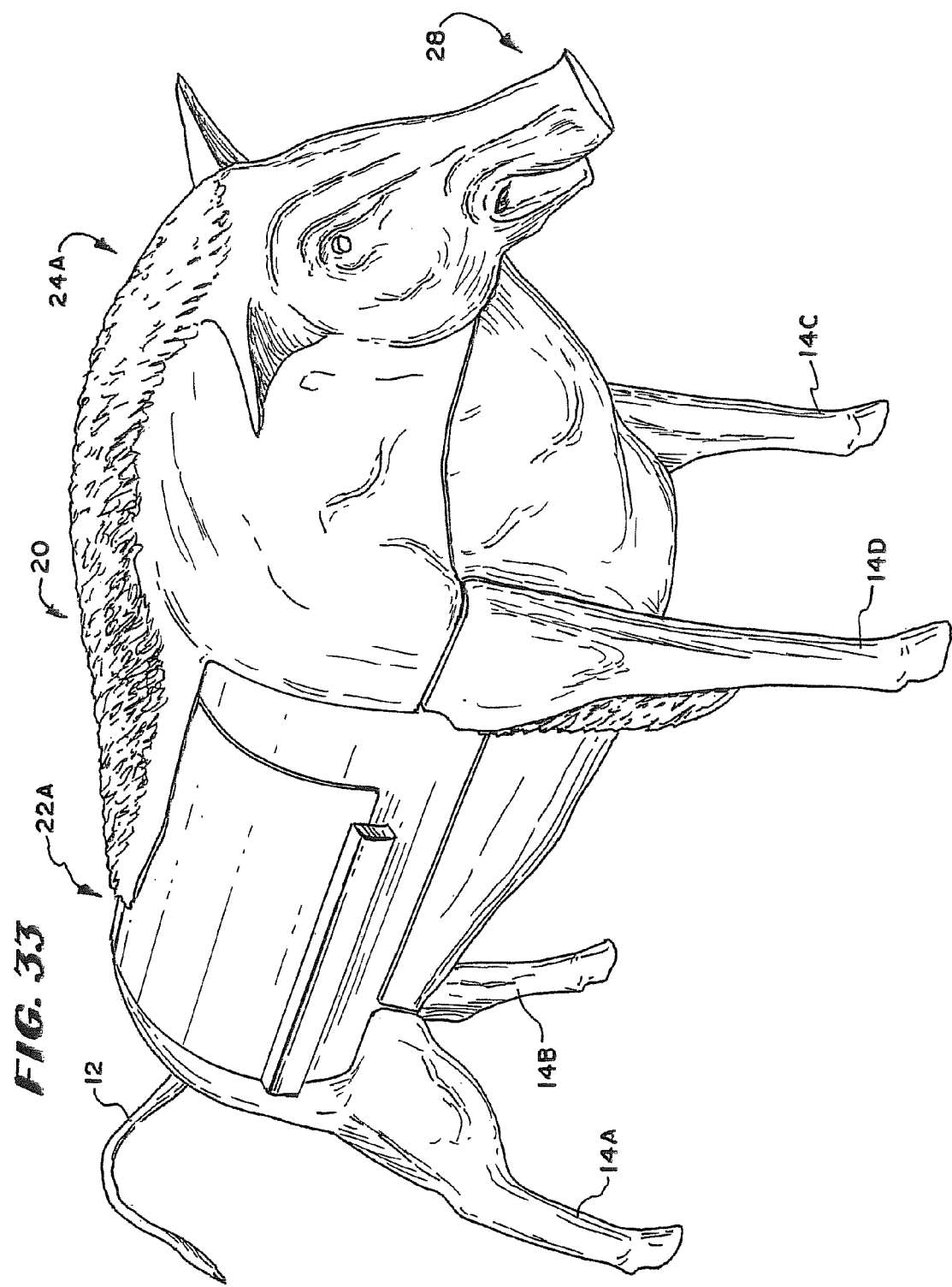

MEAT TREATMENT APPARATUS AND METHOD

RELATED CASES

This application is a continuation-in-part of U.S. provisional patent application 61/134,311 filed Jul. 9, 2008, by inventor, Russell A. Man entitled MEAT TREATMENT APPARATUS AND METHOD. The benefits of provisional patent application 61/134,311 is claimed.

BACKGROUND OF THE INVENTION

This invention relates to meat treatment apparatus and methods such as for example offset barbecue smokers and methods of making and using them.

Decorative meat treatment apparatuses and methods such as decorative smokers, decorative barbecues and offset smokers are known. One type of prior art decorative barbecue smoker is shaped in the form of an animal. This type of prior art barbecue smoker has the disadvantage of not being life like.

Offset barbecue smokers are known in which hot gasses and smoke from the firebox are directly passed to the grille for the smoker. This type of prior art barbecue smoker has the disadvantages of causing uneven cooking and smoking.

In another type of prior art offset smoker, the firebox is located at one end of the smoking chamber and below the smoking chamber. Hot gasses from the firebox rise to the top of the firebox and then flow into the smoking chamber. A flat plate separates the bottom of the smoking chamber where the smoke enters from the firebox and the cooking grille above the plate so that the smoke and other products of combustion flow along the bottom of the plate to the opposite end and then up and over the cooking chamber or grilles and out in an atmospheric exhaust that is located above the entrance from the firebox to the smoking chamber.

This smoker has several disadvantages, such as: (1) the air entering the firebox is atmospheric air at atmospheric temperature and requires considerable energy to warm the air up; (2) water, if water is used, or any liquid that flows into the smoking chamber may flow back into the fire chamber and cause difficulties at that location; and (3) the process cannot be controlled as to a temperature drop by varying the installation nor by the use of forced pumping of air through the hot products of combustion into the firebox.

SUMMARY OF THE INVENTION

Accordingly, it is an object of the invention to provide a novel meat treatment apparatus.

It is a further object of the invention to provide a novel method of making meat treatment apparatuses.

It is a still further object of the invention to provide a novel method of using meat treatment apparatuses.

It is a still further object of the invention to provide a novel barbecue smoker.

It is a still further object of the invention to provide a novel system for obtaining even cooking and smoking in an offset barbecue smoker.

It is a still further object of the invention to provide a novel layout for a decorative barbecue smoker that permits realistic representations of animals, such as bulls or boars, to be used.

It is a still further object of the invention to provide a novel barbecue smoker in which the food is evenly heated and smoked.

It is a still further object of the invention to provide a novel barbecue smoker that can provide moisture control in a superior manner.

It is a still further object of the invention to provide a novel flow path for hot products of combustion.

It is a still further object of the invention to provide a novel method for barbecuing and/or smoking.

It is a still further object of the invention to provide a novel method for controlling the heat and smoke in a barbecue smoker.

It is a still further object of the invention to provide a novel method of making a barbecue smoker.

In accordance with the above and further objects of the invention, the hot products of combustion from the firebox flow under the cooking and smoking chambers and then over the cooking and smoking chambers. The bottom of the cooking and smoking chambers and the wall between the firebox and the cooking and smoking chambers include air space or other insulating material between the firebox and/or the flow path for the products of combustion and the bottom of the cooking and smoking chambers. The air space and/or other insulation between the firebox and the cooking and smoking chambers and/or between the bottom of the cooking and smoking chambers and the products of combustion flowing beneath them are selected and controlled to cause even cooking and smoking.

The air circulation may be natural or forced. The smoke after flowing above the grille and the food that may be on the grille exits through the nostrils or the mouth of the barbeque smoker that is shaped as an animal. In one embodiment, it is shaped as a bull and in another embodiment as a boar. Between the cooking and smoking compartments and the nostrils, the path is shaped to hold heat and smoke within the cooking chamber or grilles for an effective amount of time. In the preferred embodiment, the path is curved downwardly for this purpose but other forms of restriction may be used such as baffles or narrowed portions or the like.

Thus, the hottest products of combustion first flow along a first path from the firebox to the rump section below the cooking chamber, losing some heat along the way and transferring some heat to the cooking and smoking chambers through a first insulating layer. Next, the products of combustion flow through a second path over the cooking and smoking chambers from the rump section where it is the hottest in this path to the head of the animal losing some head along the way. This flow of the products of combustion is referred to as counter flow cooking and smoking process. This counter flow cooking and smoking process is used to provide even cooking of the food regardless of where it is located with respect to the firebox.

In this specification, the words, "counter flow cooking and smoking process" means the products of combustion used to cook the food are channeled along paths that include one or more insulating layers that control the heat actually applied to the food so that the food is evenly cooked. At some locations, there may be no insulation and the products of combustion may be directly in contact with the food being cooked. In other locations, the insulating layer may be provided only by space that attenuates the amount of heat transferred to the food from those location. In the preferred embodiment, an insulating layer separates the firebox from the food section and another insulating layer separates the first path from the food. The hot products of combustion directly contact the food at the top of the food sections.

From the above description, it can be understood that the barbeque cooker of this invention has several advantages, such as for example: (1) it enables a particularly decorative design to be given to the barbeque smoker because of the layout of the functional parts of the barbeque cooker; (2) it provides relatively even cooking; and (3) it makes efficient use of the smoke and heat from the firebox.

BRIEF DESCRIPTION OF THE DRAWINGS

The above noted and other features of the invention will be better understood from the following detailed description when considered in connection with the accompanying drawings, in which:

FIG. 1 is a perspective view taken from the right hand side of a barbeque smoker in accordance with an embodiment of the invention;

FIG. 2 is a perspective view principally from the left side of the embodiment of FIG. 1;

FIG. 16 is a perspective view taken from the top of the cooking chamber or grilles within cooking and pumping sections;

FIG. 17 is a plan view of a floor pan designed to fit within and cooperate with the cooking chamber or grilles of FIG. 15;

FIG. 18 is a plan view of the cooking chamber or grilles within the embodiment of FIG. 1 with the floor pan removed;

FIG. 24 is a fragmentary perspective view taken from the top of the firebox showing the connection of the air flow tubes to the firebox and the firebox to the flow path beneath the cooking chamber or grilles;

FIG. 25 is a perspective view of a lower air jacket and upper air jacket;

FIG. 26 is a perspective view taken from the top of the upper firebox extension forming a base for the head of the animal and providing access to the firebox;

FIGS. 28A-28C are perspective views taken from the top looking into the firebox;

FIG. 29 is a perspective view taken of the air conduit for receiving air from the upper chamber and permitting it to flow downwardly into the firebox;

FIG. 30 is a perspective view of the air conduit for receiving air from the lower chamber and cross conduit for supplying air to the firebox from below the bed of coals;

FIG. 31 is a perspective view of the front of the cooking chamber showing the wall leading to the exhaust chamber positioned in the neck of the animal;

FIG. 32 is a perspective view showing the front opened for the exhaust system; and FIG. 33 is a perspective view of another smoker barbecue with the quadruped design of a boar.

DETAILED DESCRIPTION

Figure 3:
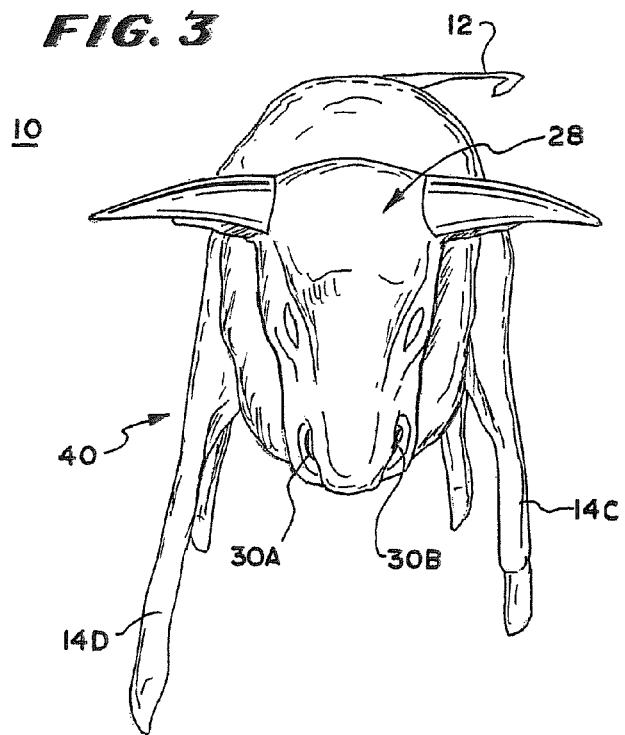
FIG. 3 is a perspective taken from the front of the barbeque smoker of the embodiment of FIG. 1.
Figure 4:
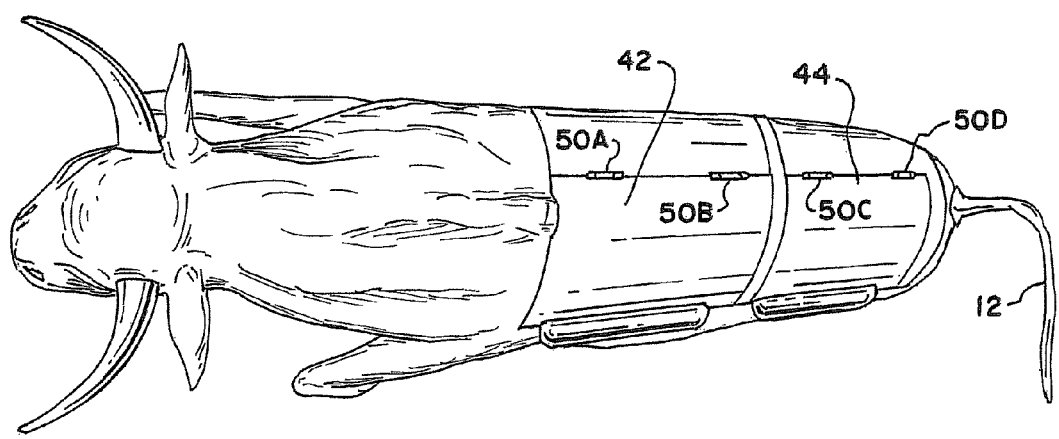
FIG. 4 is a top view of the barbeque smoker of the embodiment of FIG. 1.
Figure 6A:
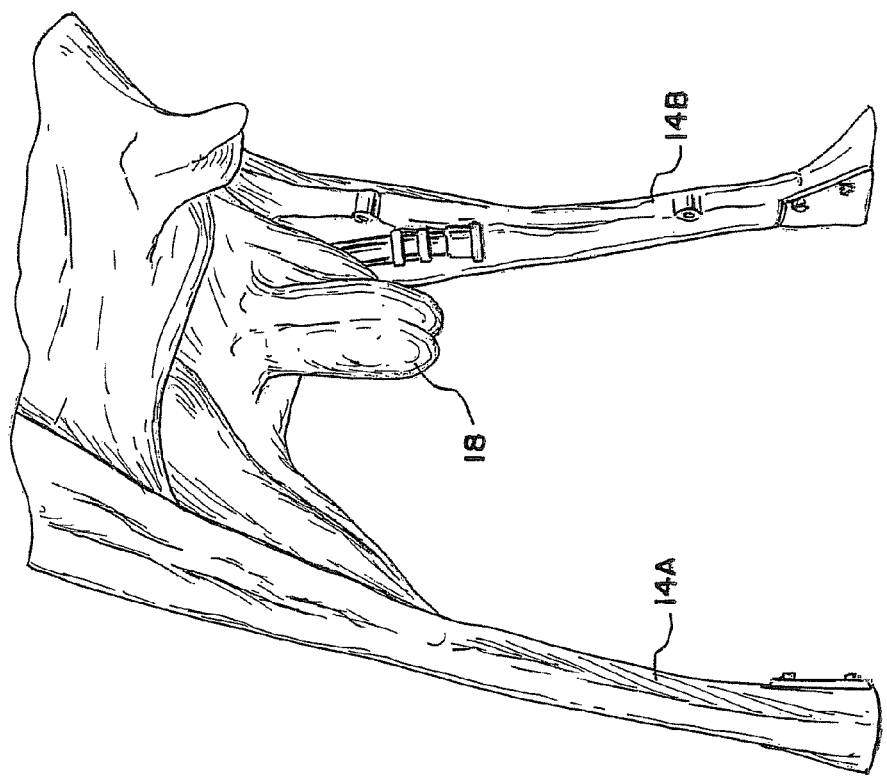
FIGS. 6A-6C are bottom views of the barbeque smoker of the embodiment of FIG. 1.

FIG. 1 is a perspective view taken from the right hand side of one embodiment 10 of a meat treatment apparatus shaped as a bull having a tail 12, legs 14A-14D, a rump section 16, a pelvis section 22, an abdomen section 20, a diaphragm section 24 and a head section 28. The pelvis section 22 and the abdomen section 20 contain an upper flow path 34 (not shown in FIG. 1, see FIG. 12) and a cooking and smoking section 36. In one embodiment, the upper flow path 34 (FIG. 12) includes an air pump which is actuated either by a motor or by manually pumping the tail 12 or both. The diaphragm section 24 contains a firebox. Testicles 18 serve as a handle for an ash removal section and the head section 28 includes an exhaust section.

With this arrangement, a firebox in the diaphragm section 24 receives air flow from an air pump section which is located in the rump section 16 of the bull. The air flow leaves the firebox and circulates through the abdomen section 20 toward the rump section 16, up over the top of the cooking and smoking section 36 and out the exhaust section in the head section 28 where it may flow either through nostrils 30A and 30B (FIG. 2) or through a mouth 32 or through both the nostrils and the mouth. Thus, a counter flow cooking and smoking process is provided. In this counter flow cooking and smoking process, the hottest air flowing over the food flows from the rump section toward the firebox and offsets the hottest air in the abdomen flowing at a greater insulation distance from the food and under the food but from the firebox toward the rump. In the specification, the term "counter flow" means the hottest products of combustion follow a flow path from the firebox to the rump at a first insulation distance from the food and below the food and the cooler products of combustion flow back from the rump toward the firebox from the rump at a second insulation distance from the food with the second insulation distance being shorter than the first insulation distance. In this specification, the terms "insulation distance" means the combined effect of distance and insulation that reduces heat transfer.

While a bull shaped animal is shown in the embodiment of FIG. 1, other embodiments such as for example a boar or any other animal may be used with the functional parts located within it in a similar manner. In each example, the parts of the quadruped cooperate and make use of the anatomy of the quadrupeds to provide an exceptionally decorative meat treatment apparatus. The most common embodiment of meat treatment apparatus will be either an outdoor grille type or a smoker or a combination barbeque smoker. The grille only embodiment may utilize the space now devoted to a firebox as a storage compartment. The cooking and smoking section 36 includes two covers 42 and 44 which also cover the upper flow path 34 but a different number of covers may be used such as for example one cover for the cooking and smoking section 36 and the upper flow path 34 or three separate covers for the cooking and smoking section 36 and the upper flow path 34.

In FIGS. 2-9, there are shown eight perspective views of the meat treatment apparatus 10, with: (1) four views (FIGS. 2 and 7-9) taken principally from the left hand side; (2) one view (FIG. 3) taken from the front; (3) one view (FIG. 4) taken from the top; (4) one view (FIG. 5) taken from the rear; and (5) three views (FIGS. 6A-6C) taken from the underside. The left-hand perspective views of FIGS. 2 and 8 and the top view of FIG. 4 best show the covers 42 and 44 for the cooking and smoking section 36 and the air flow section 34 of the meat treatment apparatus 10 and shows hinges 50A-50D and handles 56A and 56B for the covers. The front perspective view of FIG. 3 and the left side view of FIG. 8 best show the exhaust section 40 shaped as a head section 28 of the bull with horns and nostrils 30A and 30B. The fragmentary perspective views shown in FIGS. 6A-6C from the underside of the meat treatment apparatus 10 taken as a whole, show the ash removal section. The ash removal section may be removed from the bottom using the testicles 18 as a handle.

Figure 5:
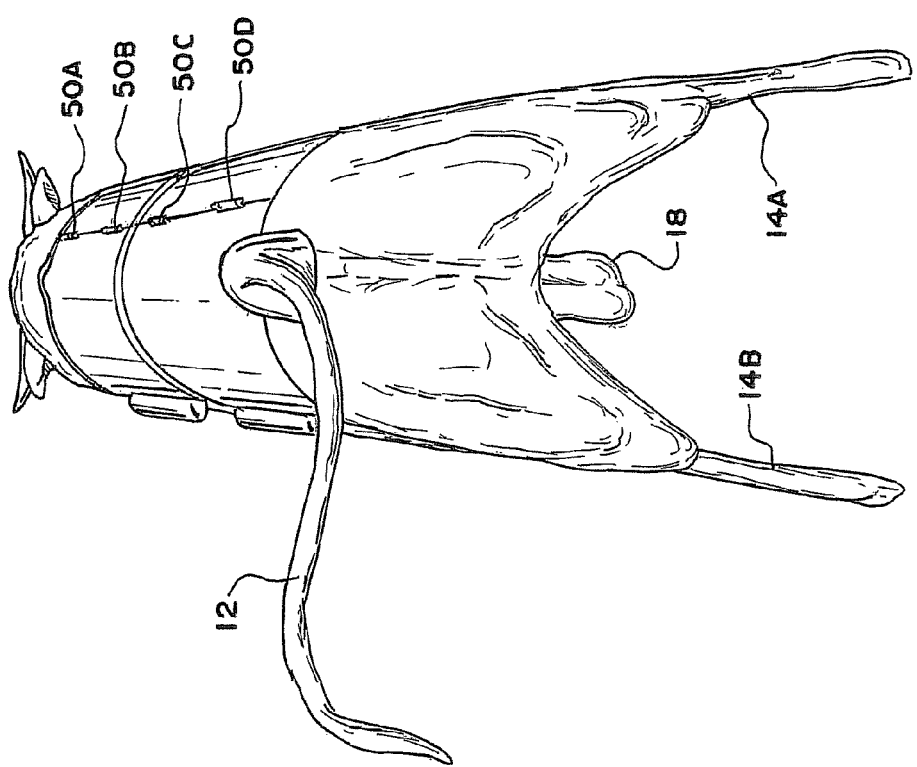
FIG. 5 is a perspective view taken from the rear of the embodiment of FIG. 1.
Figure 6B:
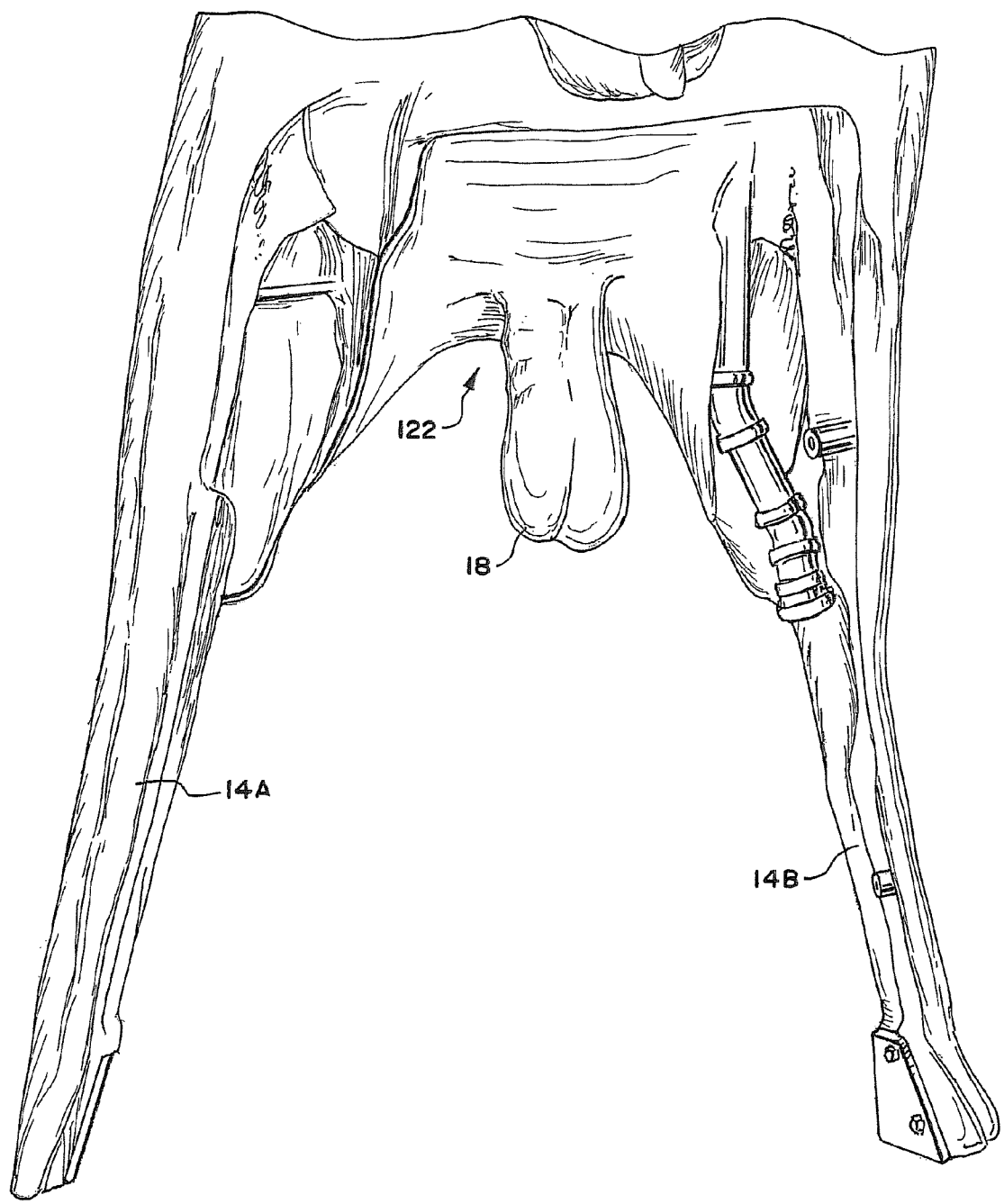
Figure 6C:
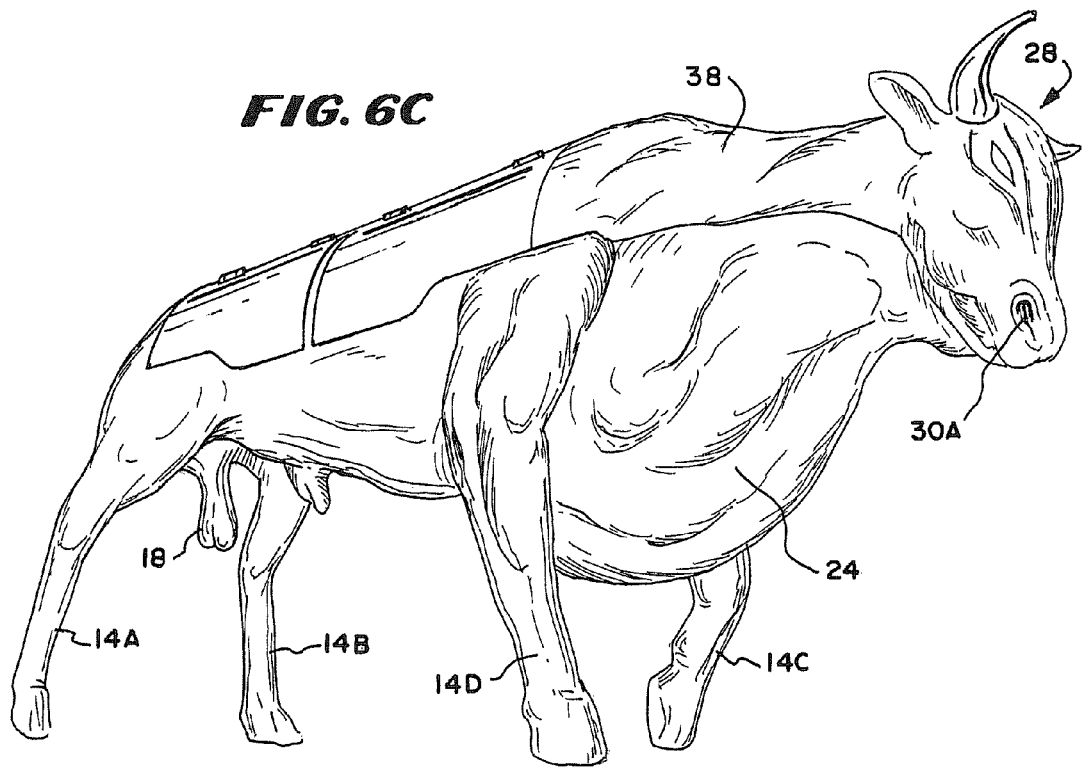

The rear perspective view of FIG. 5 best shows the manner in which the tail 12 may be used as a hand air pump to pump air through the body portion of the bull or other animal to the firebox 38 which is in the front of the animal. The firebox 38 is an offset source of heat and products of combustion used in smoking or cooking. While the tail 12 is used as a handle, any other appendage may be used for any of the different handle apparatuses such as for the ash removal section 48 or for a pump section 60 or in the case of a bull or a boar, the horns and ears may be used as handles.

Figure 7:
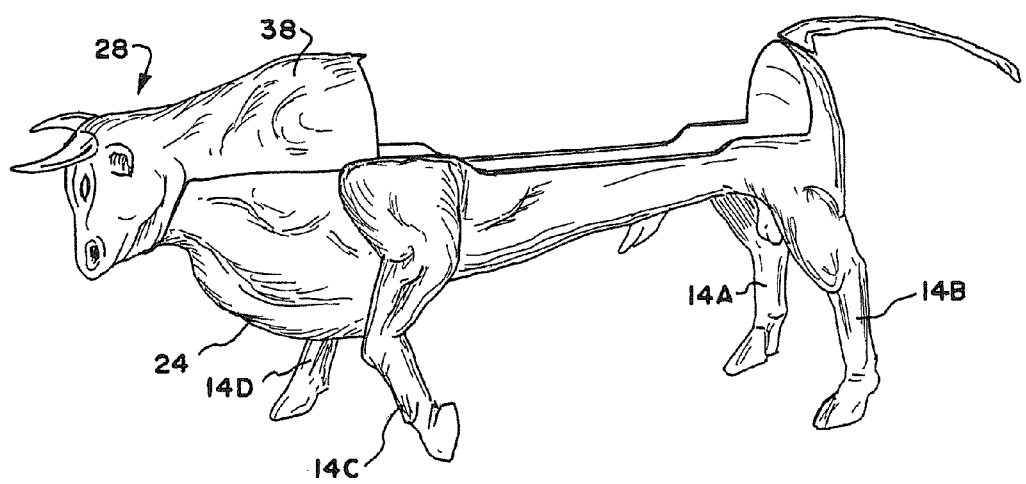
FIG. 7 is a left hand view of the barbeque smoker of FIG. 1 with the cooking chambers removed and the covers for the cooking and barbeque sections opened.

In FIG. 7, there is shown a perspective view from the left hand side of the meat treatment apparatus 10 with the covers for the cooking and air pump sections completely removed revealing the open portion where access may be gained to the inside of the air pump section, the cooking section's internal members and the ash removal section 48. This view especially illustrates the cooperative arrangement between using a quadruped for decoration in a meat treatment apparatus and the efficient layout of a functional offset barbecue smoker. Not only are quadrupeds a source of common meats used in barbequing and smoking, but the large elongated back portion provides an ideal arrangement for cooperation with the firebox 38 in the head section 28 and the entire arrangement is well supported by the legs 14A-14D of the quadruped shaped meat treatment apparatus 10.

Figure 8A:
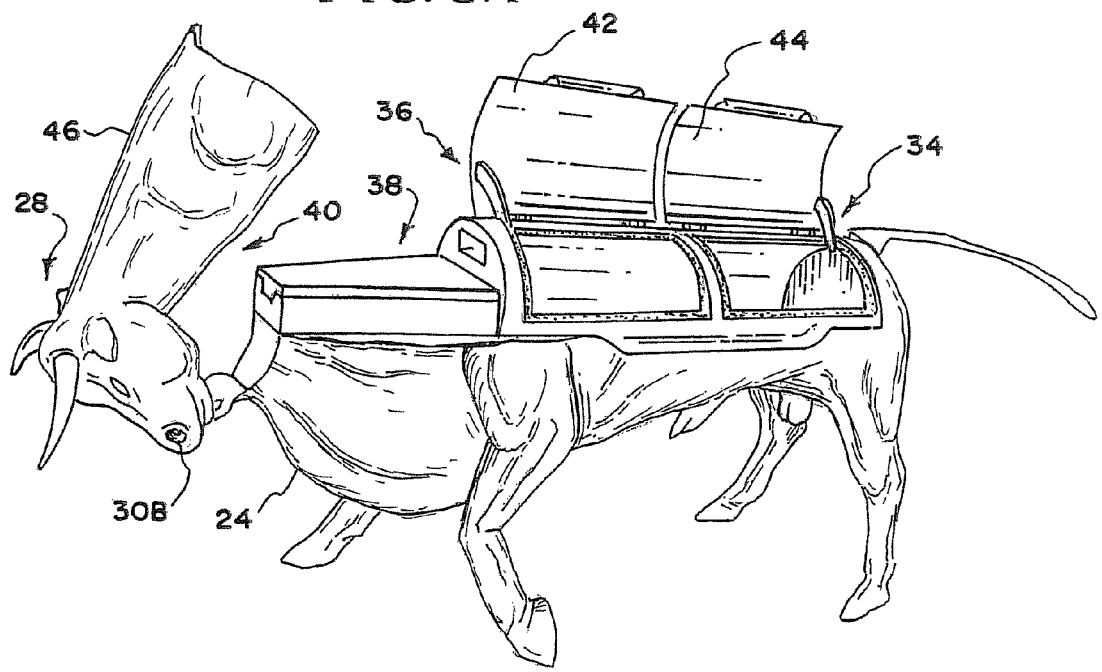
FIGS. 8A and 8B are left side perspective views of the embodiment of FIG. 1 with the firebox, smoking and barbequing sections open in FIG. 8B and the smoking and barbequing sections open in FIG. 8A.
Figure 8B:
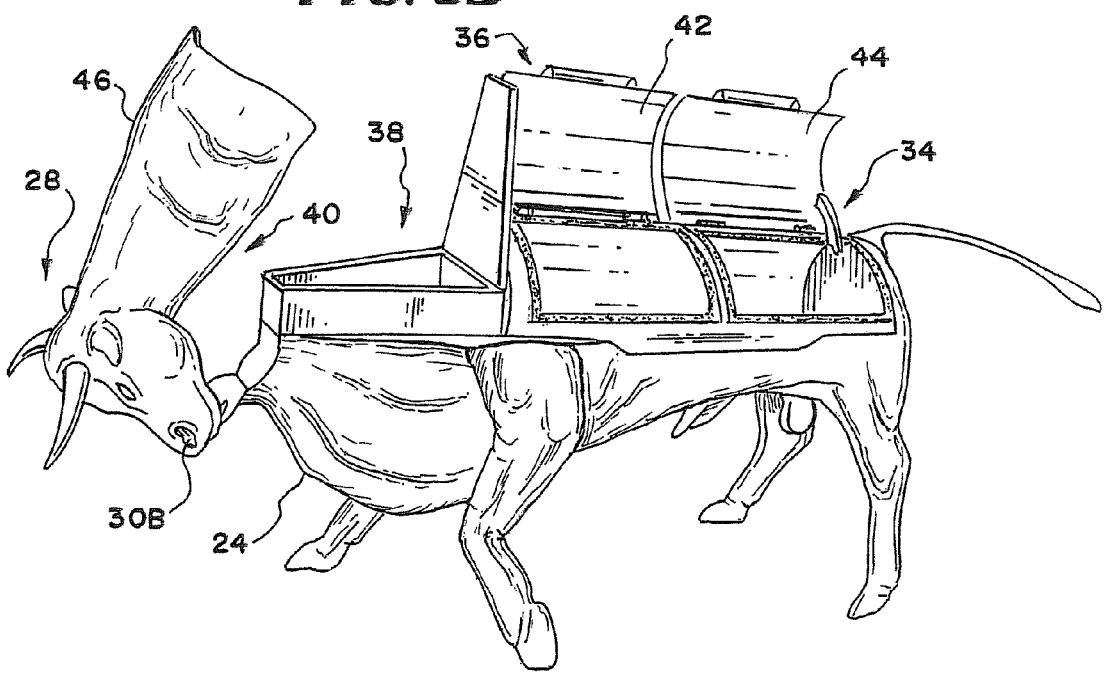
Figure 9:
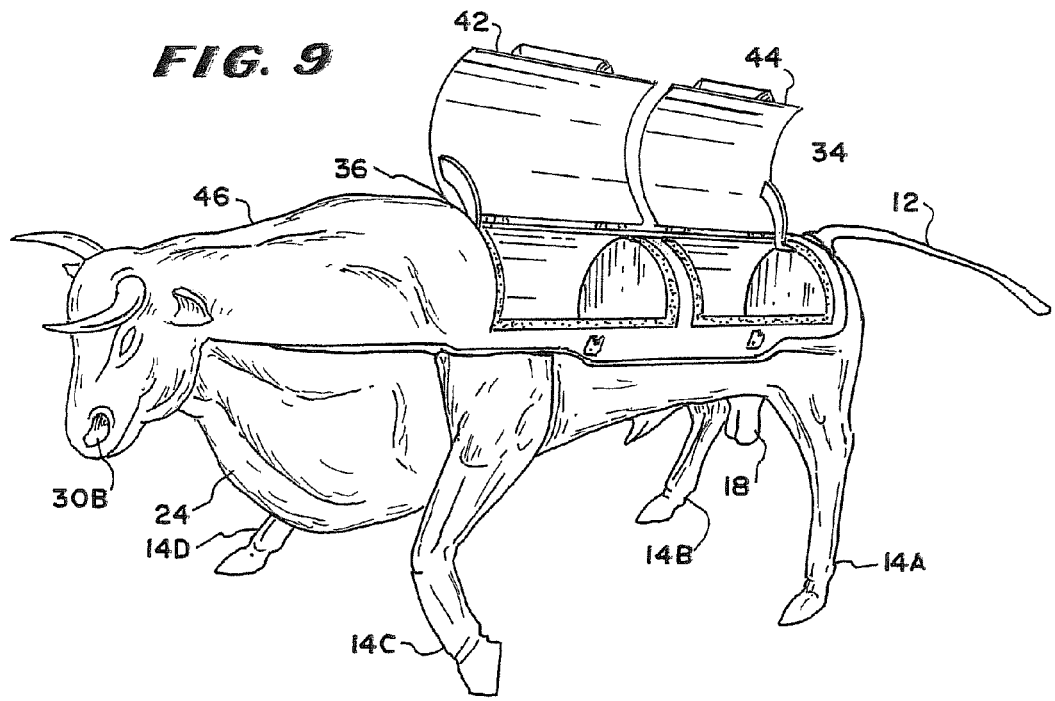
FIG. 9 is a left hand perspective view of the barbeque smoker of FIG. 1 with the covers for the smoking and barbeque sections open to expose the cooking chambers.

The perspective views of FIGS. 8A, 8B and 9 taken from the left hand side of the meat treatment apparatus 10 illustrate how the firebox section 38 may be conveniently uncovered by pivoting the head and neck of the quadruped about a location near the end of the head to reveal the exhaust section 40 and the firebox section 38 and illustrate the covers 42 and 44 of the cooking and smoking section 36 and upper flow path 34 open as they may be during a grilling operation. These features allow full access to the firebox 38 and exhaust section 40 for maintenance and refueling and full access to the cooking and smoking section 36 for the convenience of the cooking and smoking.

Figure 10:
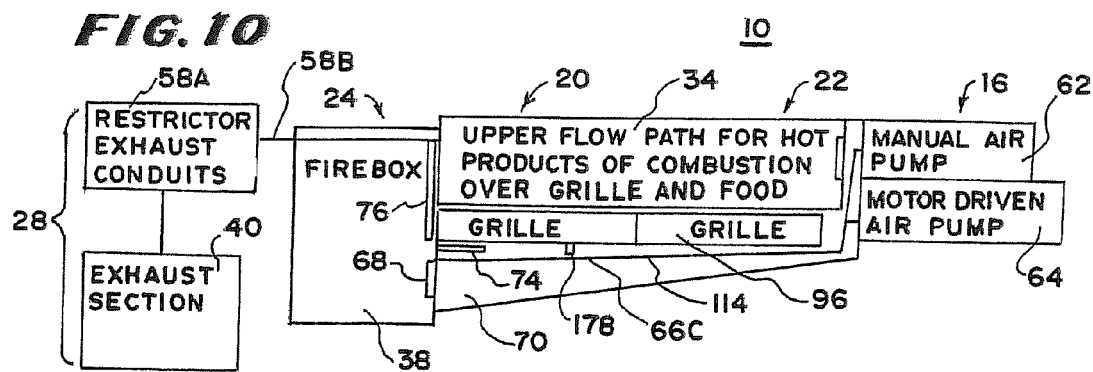
FIG. 10 is a schematic block diagram showing the general flow path of the barbeque smoker of FIG. 1 using forced air for combustion in accordance with one embodiment of the invention.

In FIG. 10, there is shown a schematic diagram of one embodiment of the meat treatment apparatus 10 illustrating the flow of gasses through the head section 28, the diaphragm section 24, the abdomen section 20, the pelvis section 22 and the rump section 16 of the bull shaped meat treatment apparatus 10. Air is pumped from the manual air pump 62 and/or motor driven air pump 64 in the rump section 16 to the firebox section 38 in the diaphragm section 24 and the hot products of combustion flow from the firebox section 38 through an opening 68 into a lower flow path 70 in the abdomen and pelvis sections 20 and 22 under a floor pan 114 that supports food compartments. The temperature can be controlled by manually setting the motor speed or by controlling the motor speed of the air pump 64 with a conventional thermostat system.

From the end of the lower flow path 70 towards the rump section 16, the hot products of combustion flow upwardly into and then along the upper flow path 34 for hot products of combustion over grille and food from the pelvis section 22 and the abdomen section 20 into a restricted flow path consisting of restrictor exhaust conduits 58A and 58B to the exhaust section 40. The upper flow path 34 extends from the manual air pump 62 and the motor driven air pump 64 over the cooking and smoking grilles 96. Underneath the upper flow path 34 over the grille and food, there is a cooking section bottom insulator. The opening 68 connects the firebox section 38 to the hot product of combustion lower flow path 70 that circulates the hot products of combustion from the firebox section 38 to the product of combustion flow path that flows along the upper flow path 34 over the grille and food into the restrictor exhaust conduits 58A and 58B into the restrictor for hard products of combustion and nose exhaust section 40 to permit its escape as visible vapor products from the nose and/or mouth of the quadruped. Within the firebox 38, there are top and side insulated conduits 74 and 76.

With this arrangement, air from the motorized air pump 64 flows through a conduit 66C into the firebox section 38. Additional air can be added as needed by the manual air pump 62 through the conduits 66A and 66B. The hot gasses of combustion from the firebox section 38 flow through the opening 68 along the lower flow path 70 up over the upper flow path 34. The lower flow path 70 for the hot gasses has insulation which may be controlled in thickness and may include baffles to control the heat underneath the grilles 96 so that food which otherwise would have a tendency to overcook in the side closest to the firebox section 38 does not overcook and does not undercook in the area most remote from the firebox section 38. Moreover, because the hotter gasses flow from the remote end of the upper flow path 34 and are hotter there than at the exhaust end, there is an overall regulated evenness in the cooking. The exhaust flows into restrictor exhaust conduits 58A and 58B that tends to hold the hot gasses or smoke over the food before permitting it to flow downward and exit through the nose or nostrils of the animal. The surface between the lower flow path 70 and the cooking chamber or grilles 96 and/or the upper flow path 34 and grille may be fully or partly blocked by a vertical divider 178 of the cooking chamber 96 or not blocked at all. (In FIGS. 10 and 11 partial blockage is shown but in FIG. 19 full blockage is shown).

Figure 11:
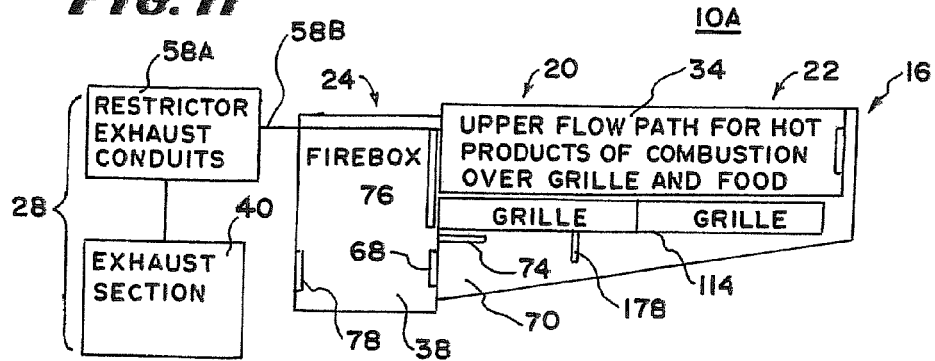
FIG. 11 is a schematic block diagram illustrating the flow path of the barbeque smoker using natural draft in accordance with another embodiment of the invention.

In FIG. 11, there is shown another embodiment 10A of meat treatment apparatus similar to the embodiment 10 but not having the motorized or manual air pumps. Instead, the air flows into the firebox 38 from a firebox opening 78 into the atmosphere and the hot products of combustion flow through the opening 68 into the lower flow path 70 and upwardly to the upper flow path 134 over the grille and food shown at 34 and from there, through the restrictor exhaust conduits 58A and 58B into the nose exhaust openings of exhaust section 40.

Figure 12:
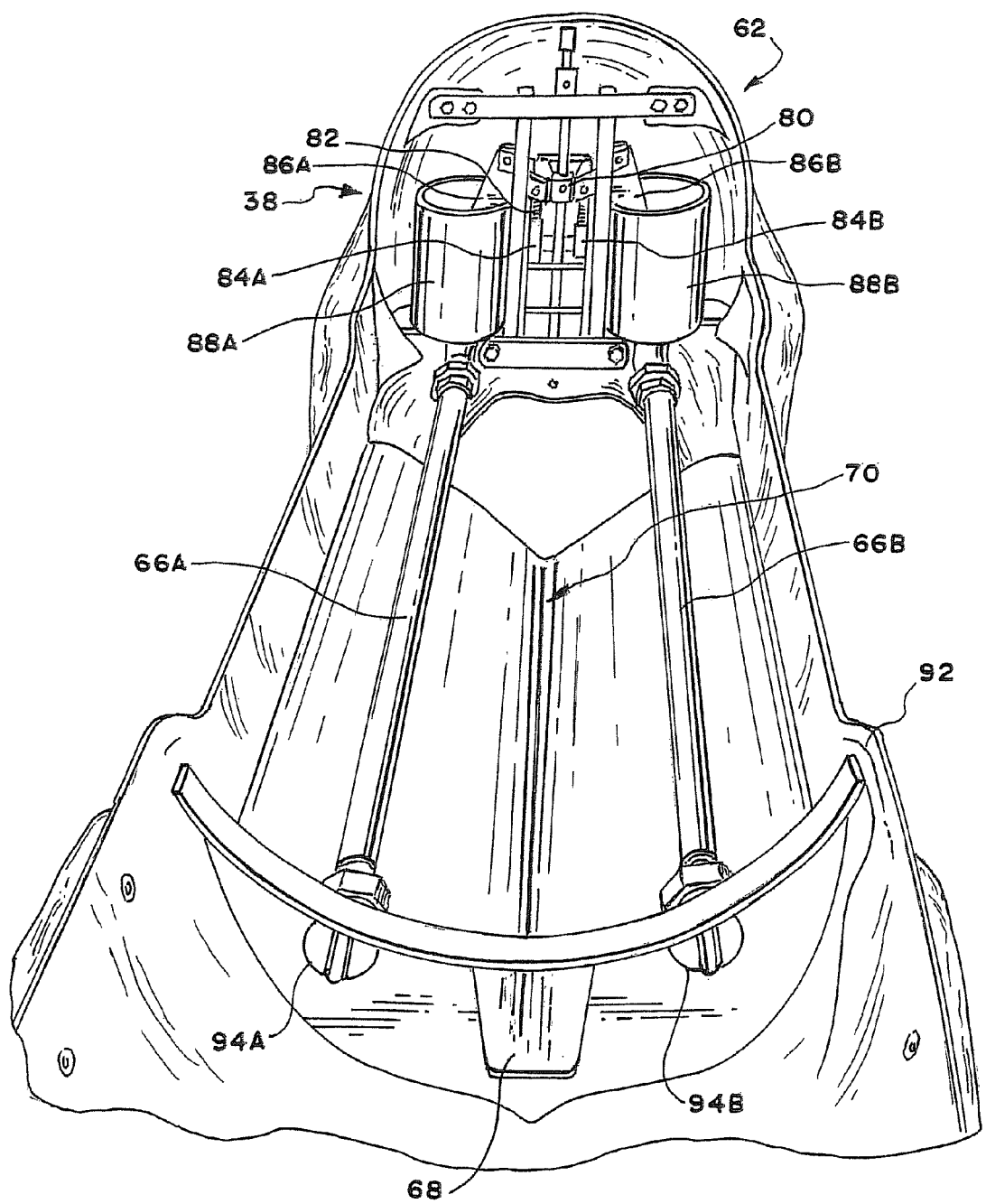
FIG. 12 is a perspective view of a hand operated air pumping system and air flow path in accordance with an embodiment of the invention.
Figure 13:
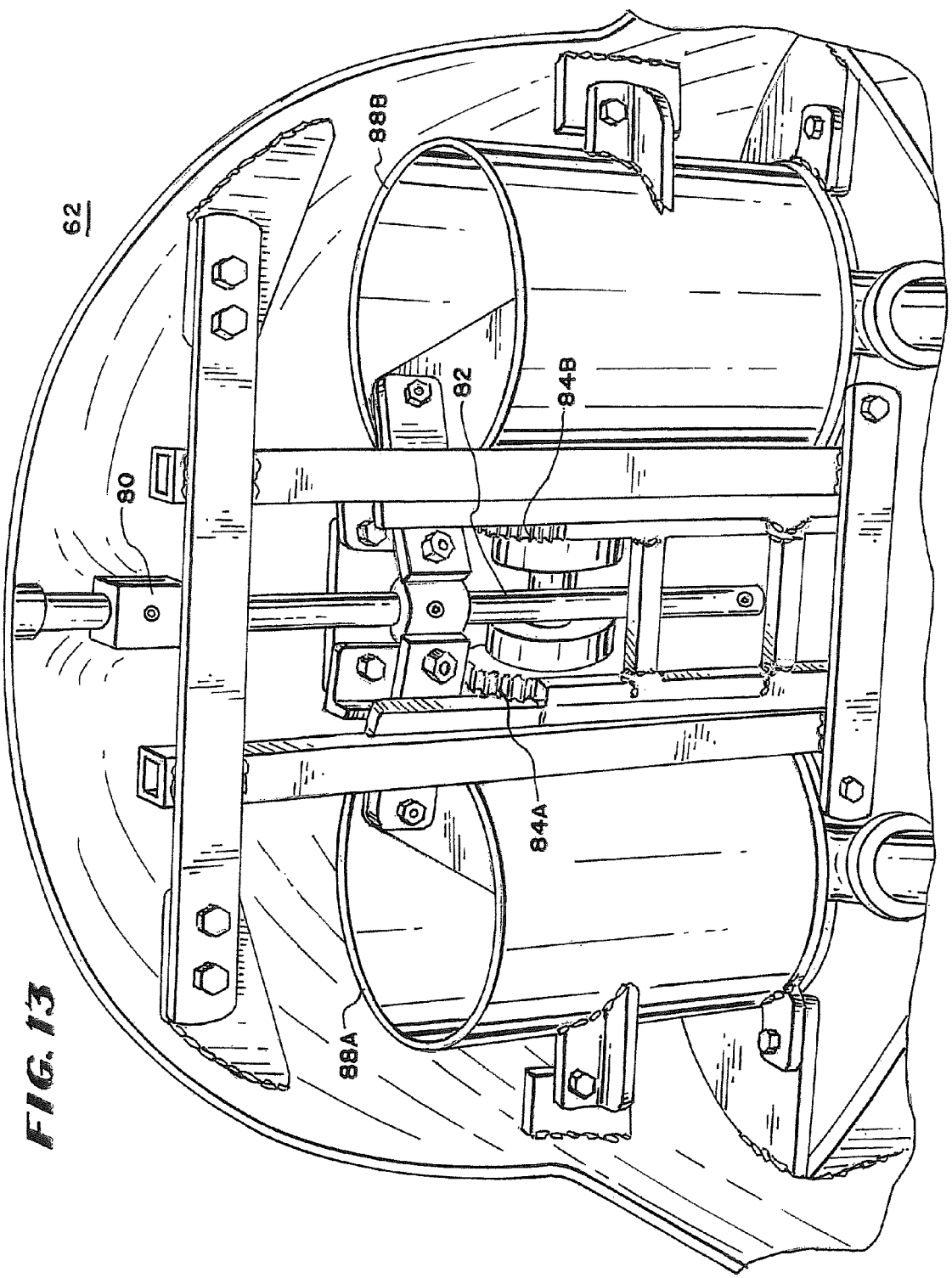
FIG. 13 is a perspective view of a portion of the hand operated air pumping system of FIG. 12.
Figure 14:
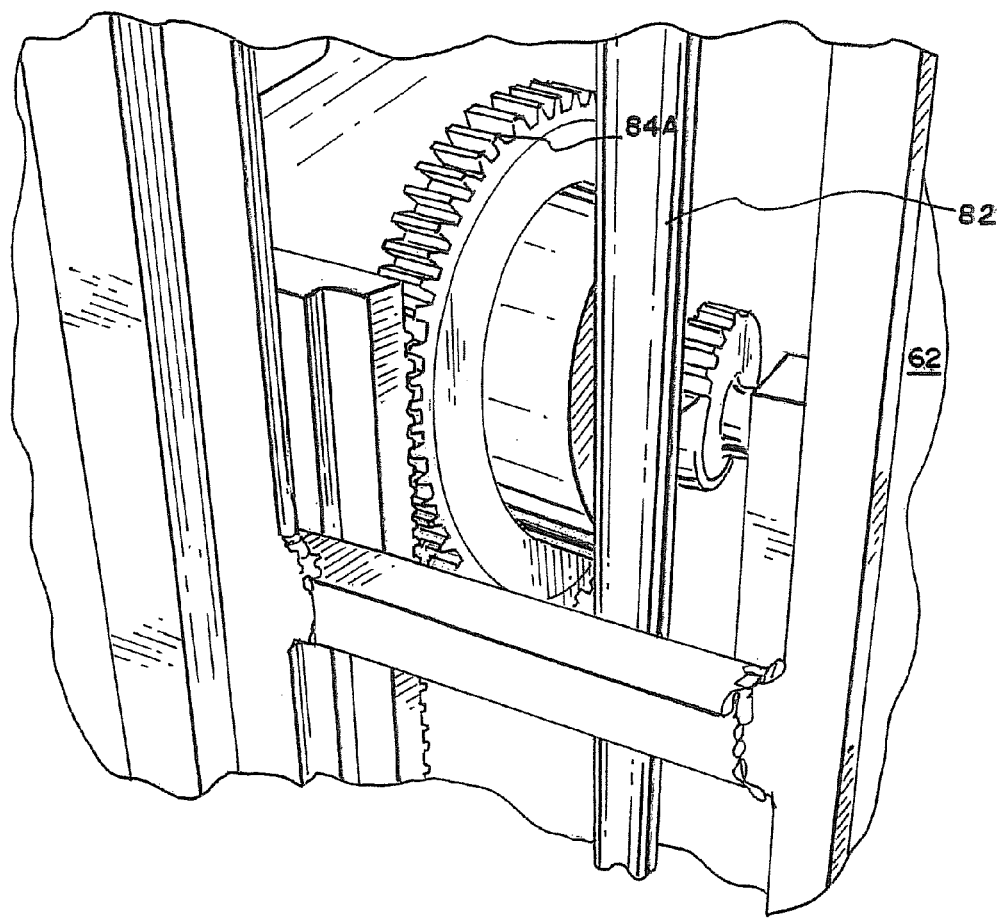
FIG. 14 is an enlarged perspective view of a portion of air circulating system of the embodiment of FIG. 13.

In FIG. 12, there is shown a perspective view taken from the upper front of the manual air pump 62 and air flow path. The manual air pump 62 includes an air pump drive shaft 80 with a rack and pinion 82 mounted to it. The rack and pinion 82 drives two end gears 84A and 84B cooperating with pinions to drive piston rods 86A and 86B which move the piston rods 86A and 86B within cylinders 88A and 88B and thus force air through conduits 66A and 66B of the lower air flow path 70 under the food grille 96 and into the firebox 38 (FIG. 8). The firebox 38 has an outer wall 92 with the hot products of combustion opening 68 centered within it and lower than two openings 94A and 94B that receive the air conduits 66A and 66B. In FIG. 13, there is shown an enlarged perspective fragmentary view of the manual air pump 62, rack and pinion 82, end gears 84A and 84B and cylinders 88A and 88B. In FIG. 14, there is shown a perspective view of an air circulating system including the manual pump 62. With this arrangement, air is pumped to the firebox 38.

Figure 15:
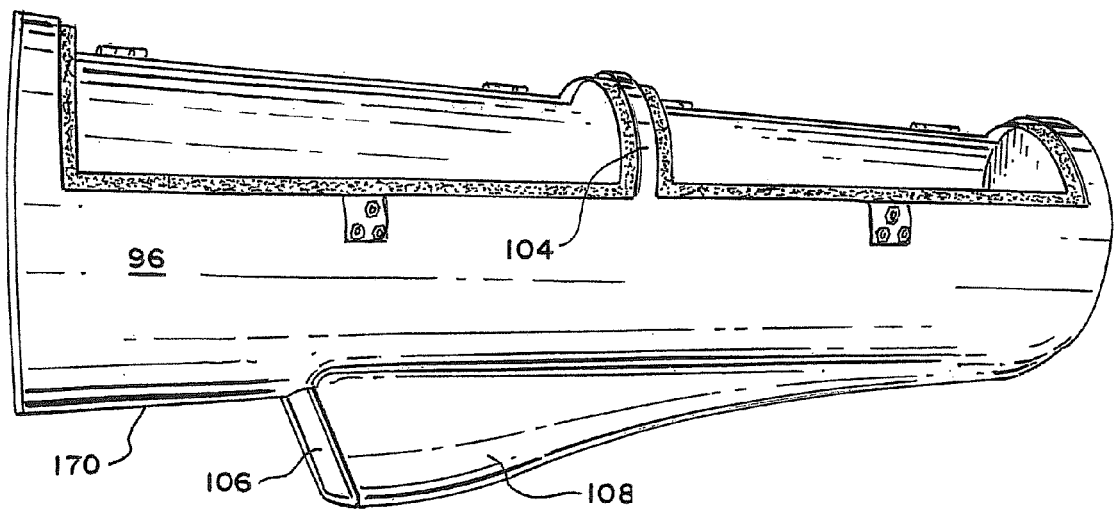
FIG. 15 is a perspective view taken from the side of a cooking chamber or grilles used in the embodiment of FIG. 1.

In FIGS. 15 and 16, there are shown perspective views taken from a side and a top respectively of the cooking chamber or grilles 96. The cooking chamber or grilles 96 fit above the air flow path conduits 66A and 66B (FIG. 12) and has a substantially cylindrical side wall 98, two circular end walls 100A and 100B and a recessed opened top 102 with a centrally located curvilinear wall portion 104 forming a band connecting the ends of the side walls 98 above the recessed opening 102. Opposite the top recessed opening 102, there is a further recessed bottom portion 106 (FIG. 18) of the side wall 98. The further recessed portion 106 (FIG. 18) has an end square portion 108 extending downwardly beyond the side wall and then tapering upwardly at a relatively sharp angle as shown at 110 (FIG. 18) followed by the more gently sloped portion 112 (FIG. 18) extending to the cylindrical end wall 100B. The recessed parallelepiped shaped opening 108 and the two sloped portions 110 (FIG. 18) and 112 (FIG. 18) may receive hot air at the bottom of the cooking chamber or grilles 96 underneath the floor pan 114. With this arrangement, the hot products of combustion contact the floor pan 114 to heat the food a distance beyond the firebox 38 for more even heating.

In FIG. 17, there is shown a perspective view taken from the top of a removable floor pan 114 that fits in the bottom of the cooking chamber or grilles 96 of FIG. 16 and in FIG. 18, there is shown a top perspective view of the cooking chamber or grilles 96 with the floor pan 114 removed. The floor pan 114 includes a plurality of food compartments, two of which are shown at 116A and 116B and at least one closable vent 118 for permitting the flow of hot products of combustion upwardly above the floor pan 114 from the recessed top opening 102 (FIG. 16) of the cooking chamber 96 of FIG. 16. The vent 118 may be opened as shown in FIG. 17 to permit the hot products of combustion to flow therein.

Figure 19:
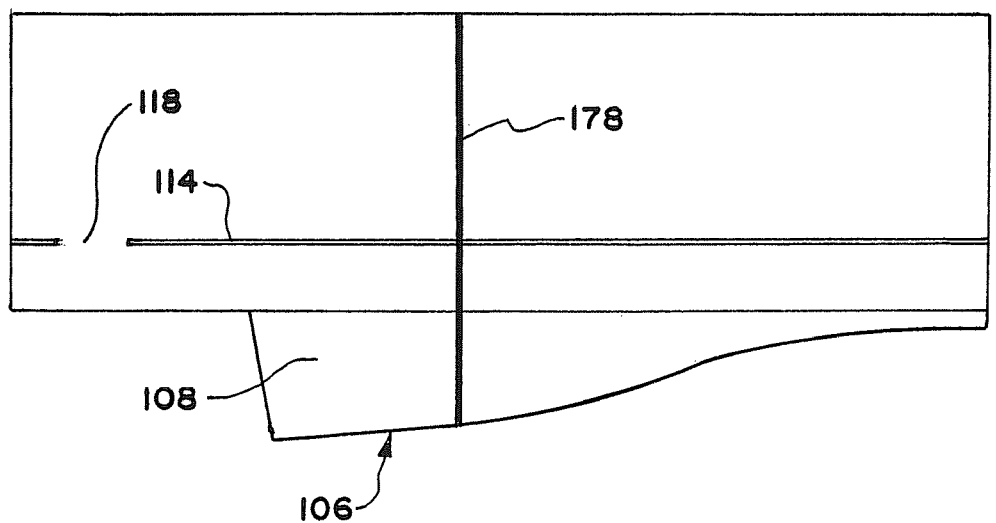
FIG. 19 is a schematic view of the cooking chamber or grilles with the floor pan in place and a plurality of vertical dividers to change the size of cooking sections.
Figure 20:
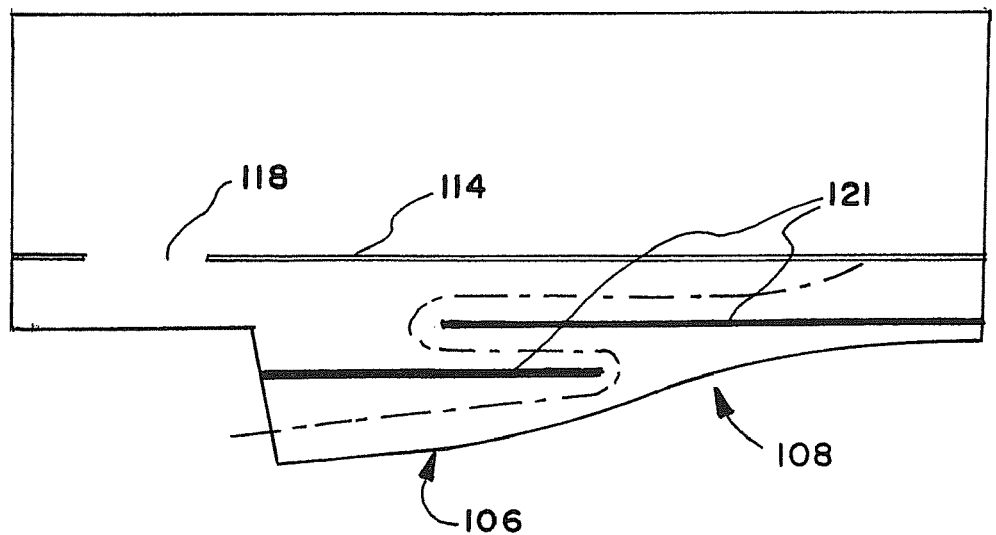
FIG. 20 is another schematic view showing horizontal dividers in the cooking chamber or grilles below the floor pan to retain heat within the embodiment of barbeque smoker of FIG. 1.

In FIG. 19, there is shown a schematic diagram of a cooking chamber 96A with the floor pan 114 in place and a plurality of vertical dividers 178 dividing the cooking chamber or grilles 96A into sections, with at least one vent such as 118 in the active divider section to receive air from the recessed portions or parallelepipeds 106 and 108. In this manner, when the food is of a limited amount, the barbequing and smoking may take place faster and at higher temperatures and/or conserve fuel. In FIG. 20, there is shown another embodiment of cooking chamber 96B having horizontal dividers 121 for slowing the hot air down within the cooking chamber 96B and recessed portions 106 and 108 as well as the vent 118 in the floor pan 114 to use less fuel and be able to cook and smoke in a shorter amount of time at higher temperatures or a more dense product of combustion. In the embodiments of FIGS. 19 and 20, the hot products of combustion flow out of the meat treatment apparatus 10 following the same exhaust section in the head section 28 as shown in FIGS. 10 and 11. In the preferred embodiment, the floor pan first loosely so that the products of combustion flow into the cooking chamber and thus the vent 118 may be omitted.

Figure 21:
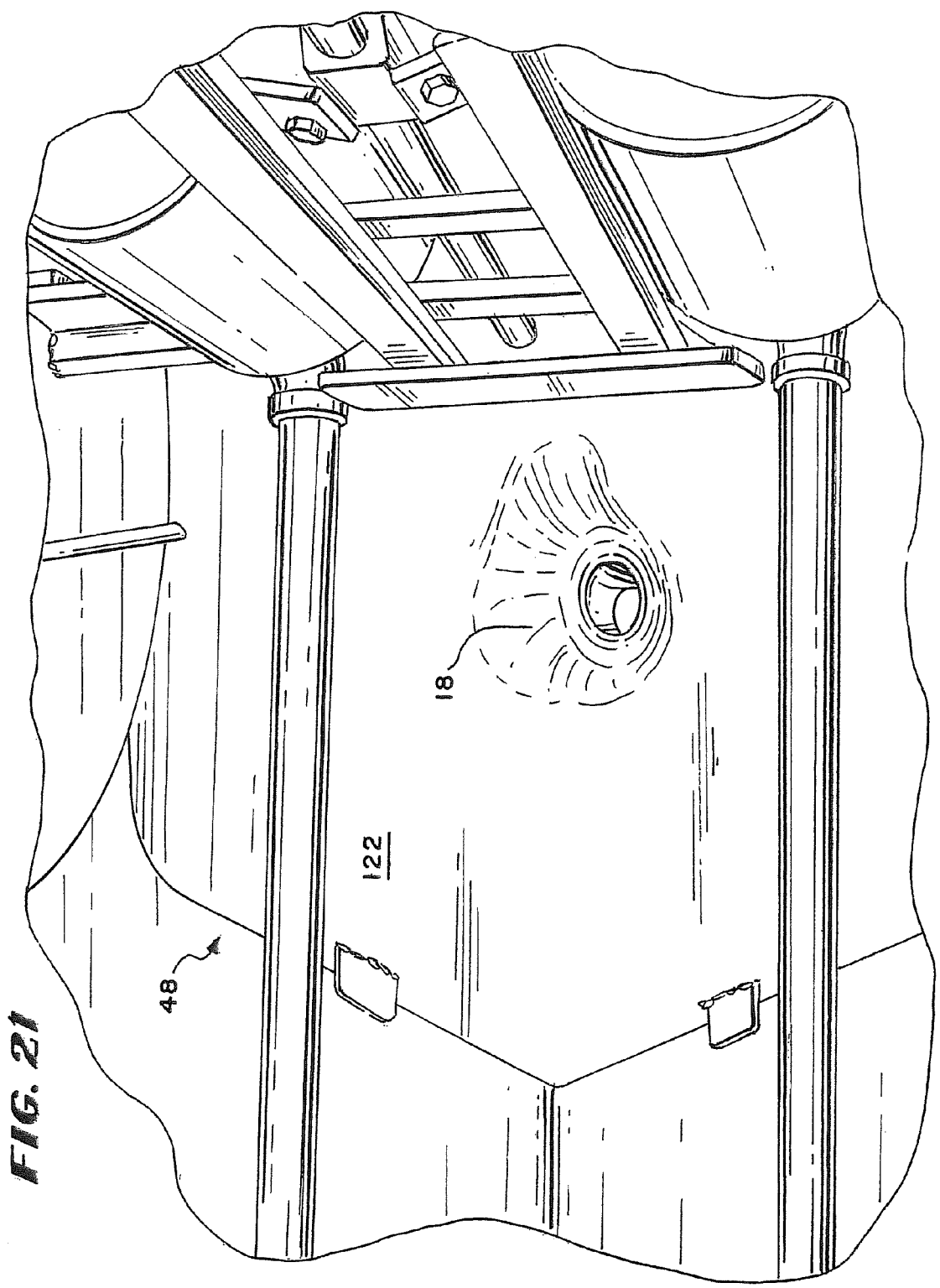
FIG. 21 is a fragmentary plan view of a portion of the embodiment of FIG. 1 showing an ash dump fitted within the embodiment of FIG. 1.
Figure 22:
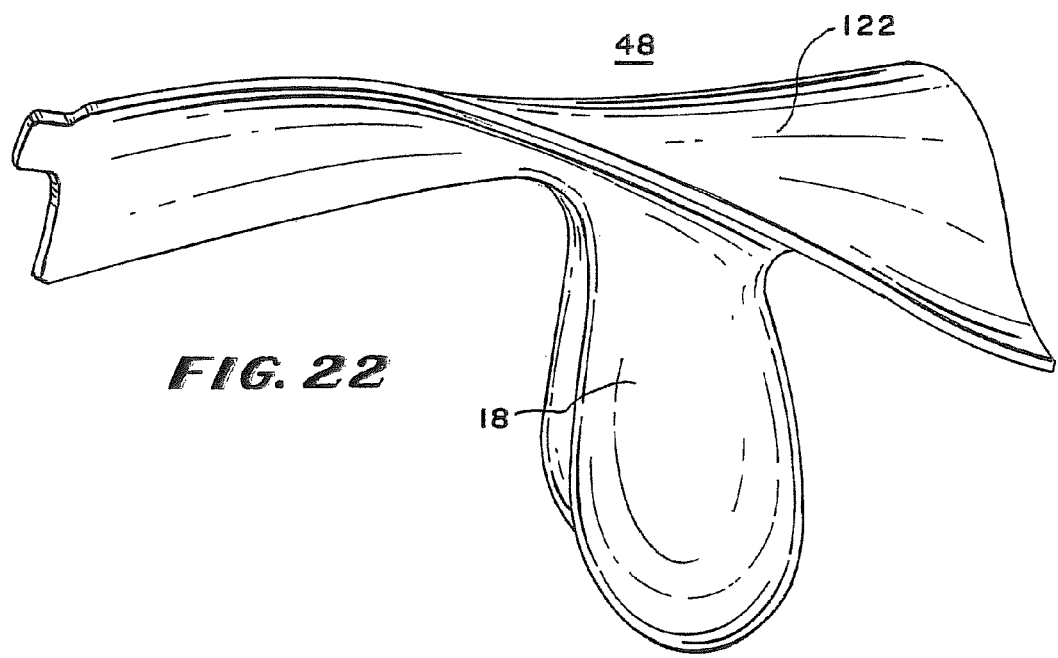
FIG. 22 is a side perspective view of a portion of a bull which may be utilized to insert and remove the ash dump.

In FIG. 21, there is shown a perspective view from the top of the ash removal section 48 with an ash dump 122. In FIG. 22, there is shown a side perspective view of the ash removal section 48. With this arrangement, the testicles 18 of the bull may be used to remove the ash dump 122. In FIG. 22, the ash dump 122 is shown showing the manner in which it is contoured and may be inserted into the opening to close the ash dump.

Figure 23:
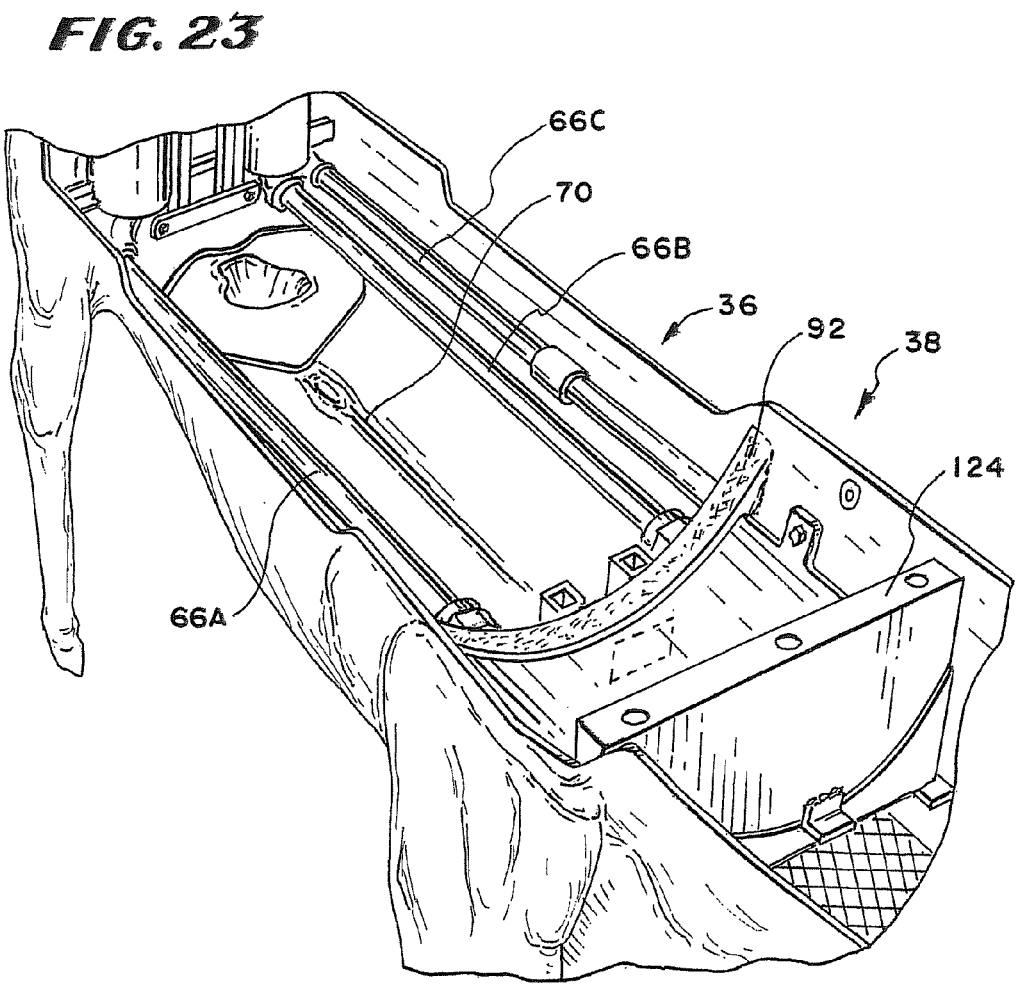
FIG. 23 is a fragmentary perspective view taken from the top of the firebox and lower flow path.
Figure 27:
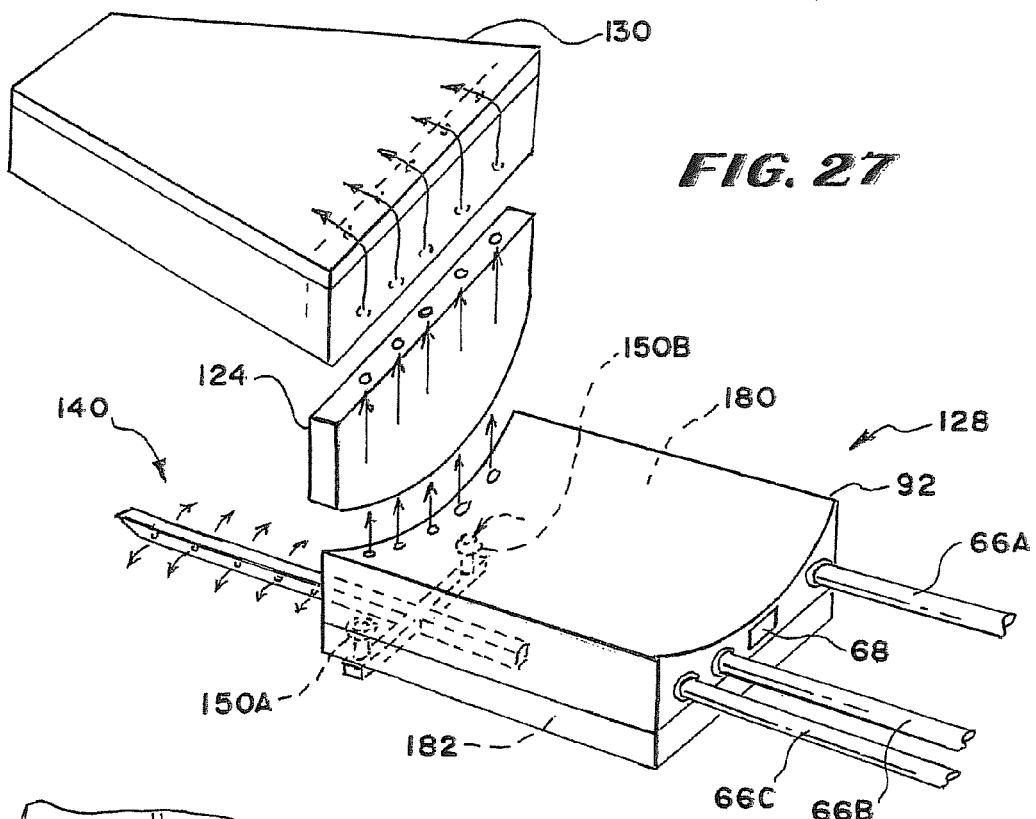
FIG. 27 is a schematic diagram showing the general layout of the firebox lower chamber, upper chamber, upper air jacket, lower air jacket and upper firebox extension in accordance with the embodiment of FIG. 26.

In FIG. 23, there is shown a perspective view taken from the top of the cooking section 36 and the firebox section 38 showing the air conduits 66A and 66B entering the firebox section 38 at the firebox outer wall 92 of the firebox 38. This provides air to the section between the firebox outer wall 92 of the firebox 38 and an upper air jacket wall 124. In FIG. 24, there is shown a perspective view of the firebox 38 and a portion of the cooking chamber 96 taken from the top showing the firebox outer wall 92 of the firebox 38 with the air flow conduits 66A, 66B and 66C passing through it and upper and lower chambers 180 and 182 (FIG. 27) between the firebox outer wall 92 and the upper air jacket wall 124. As shown in this view, an upper firebox extension 130 receives air from the upper air jacket wall 124 which in turn receives air from the upper chamber 180 (FIG. 27). The opening 68 in the firebox outer wall 92 permits the hot products of combustion from the firebox 38 to flow into the cooking chamber 96 and the lower flow path 70.

In FIG. 25, there is shown a perspective view of a lower air jacket 128, the upper air jacket wall 124, a lower chamber 182 and an upper chamber 180 (FIG. 27). The firebox outer wall 92 has openings for air inflow and the opening 68 for the hot products of combustion to flow out (FIG. 24). In FIG. 27, there is shown a schematic view of the upper firebox extension 130 showing the manner in which conduit 66C provides air into the upper chamber 180 located in the lower air jacket 128 and from there to the upper air jacket 124.

In FIG. 26, there is shown a perspective view of the upper firebox extension 130 with a cover 134 opened to show the interior 132 of the firebox extension 130. There are air holes in a boxed wall 154 of the firebox extension 130 shown at 136A-136E below hinges 138. As shown in FIGS. 24-27, the lower air jacket 128 is divided into upper and lower chambers 180 and 182. The conduits 66A and 66B from the manual air pump 62 are connected to the lower chamber 182 which is connected to the air grate 140 (FIGS. 28 and 30). Conduit 66C from the motor driven air pump 64 is connected to the upper chamber 180 which is connected to the upper air jacket wall 124 which is connected to the upper firebox extension 130. These air sources could be routed directly to the cooking chamber in an embodiment only designed as a grille.

Figure 28A:
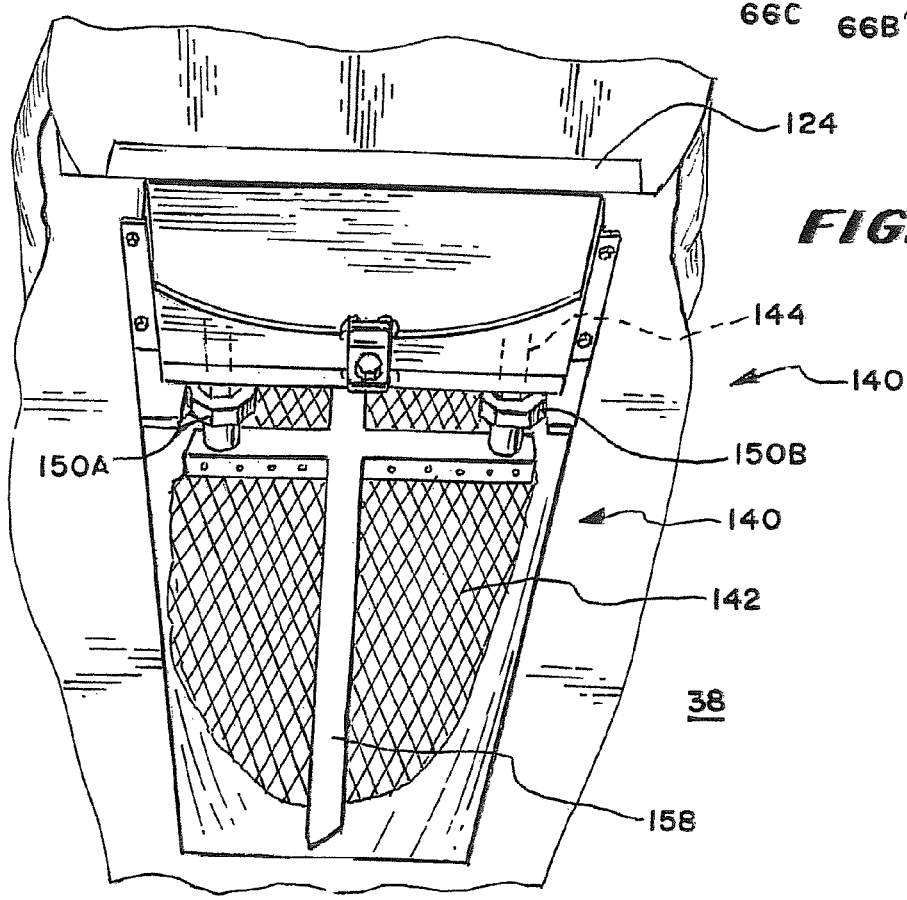

In FIGS. 28A-28C, there are shown perspective views looking downwardly into the firebox 38 with the upper extension removed showing the air grate 140 including an upper air flow mesh 142, a connecting conduit 144 located in the lower air jacket 128 (FIG. 27) leading to the upper air jacket wall 124 (FIG. 27). The air grate 140 is connected to the manual air pump 62 through connectors 150A and 150B connected to the lower chamber 182 of the lower air jacket 128.

In FIG. 29, there is shown a perspective view looking down into the firebox 38 with the upper firebox extension 130 in place showing a front wall 154 with the air holes 136A-136E and the air grate 140 below it connected to the lower air jacket 128. In FIG. 30, there is shown a perspective view of an air conduit 158 that receives air from the lower chamber 182 (FIG. 27) in the connectors 150A and 150B and releases the air through air holes 160A-160N spaced apart on the main elongated air conduit 162 and cross air conduit 164 at the bottom of the firebox 38. This air is distributed to the firebox by the air holes 160A-160N. In FIG. 31, there is shown a perspective view of the exhaust section 40 looking at the exhaust section 40 with a front panel 166 dividing the cooking chamber 36 from the exhaust section 40 and having within it exhaust openings 168A and 168B for exhaust products of combustion to flow through the head 28 of the animal. In FIG. 32, there is shown a perspective view of the firebox 38, cooking chamber 36 and exhaust section 40 showing the conduits 172A and 172B leading to the nostrils of the bull through a curved downward restricted path that causes the products of combustion to accumulate in the cooking chamber. In FIG. 33, there is shown a perspective view of another smoker barbecue shaped as a boar and having the same features as the smoker barbecue of FIGS. 1-32 except that it has the design of a different quadruped. In FIG. 33, the same or similar numbers are used to indicate the parts of the embodiment of FIG. 33 that correspond to the embodiment of FIGS. 1-32. This illustrates that the basic layout may be applied to any quadruped.

From the above descriptions, it can be understood that the barbeque cooker of this invention has several advantages, such as for example: (1) it enables a particularly decorative design to be given to the barbeque smoker because of the layout of the functional parts of the barbeque cooker; (2) it provided relatively even cooking; and (3) it makes efficient use of the smoke and heat from the firebox due to precise control of air movement.

While a preferred embodiment of the invention has been described in some detail, many modifications and variations of the invention are possible in light of the above teachings. Therefore, within the scope of the appended claims, the invention may be practiced otherwise than as specifically described.

What is claimed is:

1. A meat treatment apparatus comprising:
a firebox positioned at a first location;
a grille positioned at a second location horizontally offset from said first location;
a source of air positioned at a third location horizontally offset from said first and second locations;
at least one first flow path for guiding air from said source of air to said firebox;
at least one second flow path for guiding products of combustion from said firebox under said grille to a fourth location;
at least one third flow path for guiding the products of combustion from said fourth location over said grille to a fifth location;
an exhaust outlet;
at least a fourth flow path for guiding said products of combustion from said fifth location to said outlet;
said outlet being horizontally offset from said firebox and said grille.

2. A meat treatment apparatus in accordance with claim 1 wherein said grille has a cover and the products of combustion are applied to meat on said grille with the cover closed and a restrictor is included in said fourth flow path to hold smoke in contact with said meat wherein the meat treatment apparatus is used as a smoker.

3. A meat treatment apparatus in accordance with claim 1 wherein said grille has a cover and said cover is openable wherein the products of combustion heat the bottom of the grille to barbecue meat on said grille.

4. A meat treatment apparatus in accordance with claim 3 wherein baffles are provided in said second flow path under said grille whereby hot products of combustion are retained under said grille to increase the heat.

5. A meat treatment apparatus in accordance with claim 1 wherein said source of air is a source of forced air; said source of forced air being at said fourth location offset horizontally from said firebox, said grille and said exhaust section; a flow path being provided from said source of forced air to said firebox.

6. A meat treatment apparatus in accordance with claim 5 wherein said source of forced air is a hand pump.

7. A meat treatment apparatus in accordance with claim 5 wherein said source of forced air is a motor driven pump.

8. A decorative offset barbeque smoker comprising:
a housing shaped as a quadruped having a head portion, four legs, a diaphragm, an elongated abdomen portion, a pelvis portion and a tail;
a firebox positioned in the diaphragm portion;
a grille positioned in the elongated abdomen portion;
a source of air positioned at a first location horizontally offset from said head portion, diaphragm portion and elongated back portion;
at least a first flow path for guiding air from said source of air at said first location to said firebox at a second location;
at least a second flow path for guiding the products of combustion from said firebox under said grille to a third location;
at least a third flow path for guiding products of combustion from said third location to a fourth location over said grille;
a fourth flow path for guiding said products of combustion from said fourth location to an exhaust outlet in said head portion;
said exhaust outlet being horizontally offset from said firebox and grille.

9. A decorative offset barbeque smoker in accordance with claim 8 wherein said grille has an openable cover shaped as the elongated back portion of a quadruped and the products of combustion are applied to meat on said grille with the cover closed and at least one restrictor is included in said fourth flow path to hold smoke in contact with said meat wherein a meat treatment apparatus is used as a smoker.

10. A decorative offset barbeque smoker in accordance with claim 8 wherein baffles are provided in said second flow path under said grille whereby hot products of combustion are retained under said grille to increase the heat.

11. A decorative offset barbeque smoker in accordance with claim 8 wherein said source of forced air is a hand pump; said hand pump including a handle for actuating the pump, said handle being shaped as a tail of the quadruped.

* * * * *